(12) United States Patent
Tutor

(10) Patent No.: US 11,383,690 B2
(45) Date of Patent: Jul. 12, 2022

(54) BRAKE BLEEDING SCREW AND TOOL WITH QUICK-CONNECT FITTINGS

(71) Applicant: Tony Mark Tutor, Cornelius, NC (US)

(72) Inventor: Tony Mark Tutor, Cornelius, NC (US)

( * ) Notice: Subject to any disclaimer, the term of this patent is extended or adjusted under 35 U.S.C. 154(b) by 0 days.

(21) Appl. No.: 17/424,926

(22) PCT Filed: Jan. 22, 2020

(86) PCT No.: PCT/US2020/014628
§ 371 (c)(1),
(2) Date: Jul. 22, 2021

(87) PCT Pub. No.: WO2020/154413
PCT Pub. Date: Jul. 30, 2020

(65) Prior Publication Data
US 2022/0105921 A1    Apr. 7, 2022

Related U.S. Application Data

(60) Provisional application No. 62/795,409, filed on Jan. 22, 2019.

(51) Int. Cl.
*B60T 17/22* (2006.01)
*B60T 11/30* (2006.01)
*B25B 13/06* (2006.01)
*F16D 125/16* (2012.01)
*B25B 13/48* (2006.01)

(52) U.S. Cl.
CPC ............ *B60T 17/222* (2013.01); *B25B 13/06* (2013.01); *B60T 11/30* (2013.01); *B25B 13/48* (2013.01); *F16D 2125/16* (2013.01)

(58) Field of Classification Search
CPC .. B60T 17/222; B60T 11/30; Y10T 137/6881; B25B 13/06; B25B 13/48; F16D 2125/16
See application file for complete search history.

(56) References Cited

U.S. PATENT DOCUMENTS 2,771,093 A * 11/1956 Wilson .................. F15B 21/044
137/543.17
3,635,262 A    1/1972 Stebbins
(Continued)

OTHER PUBLICATIONS

Thomas, Shane, International Search Report, dated Apr. 14, 2020, United States Patent Office., PCT/US2020/014628.

*Primary Examiner* — David B. Thomas
(74) *Attorney, Agent, or Firm* — Edwin A. Sisson, Attorney at Law, LLC; Jeffrey J. Banyas; Edwin A. Sisson

(57) ABSTRACT

A tool for bleeding brakes includes a primary assembly, a quick-connect actuator assembly, and a nozzle fitting. The primary assembly has a hollow central shaft, a female quick-connect fitting, and a socket wrench at a distal end of the shaft. The quick-connect actuator assembly is in operates the female quick-connect fitting. The nozzle fitting is disposed at a proximal end of the central shaft, is in fluid communication with the socket wrench via the hollow central shaft, and is adapted to receive an end of a brake fluid waste line. The quick-connect fitting receives and retains the bleed screw such that the socket fits around a hex fitting on a bleed screw. The wrench loosens the bleed screw causing fluid to flow through the tool and out the nozzle fitting.

20 Claims, 23 Drawing Sheets

(56) References Cited

U.S. PATENT DOCUMENTS

| | | | |
|---|---|---|---|
| 3,677,513 A * | 7/1972 | Truelove | B25B 27/0042 |
| | | | 141/98 |
| 3,718,350 A | 2/1973 | Klein | |
| 3,809,359 A * | 5/1974 | Truelove, Sr. | B60T 17/222 |
| | | | 141/98 |
| 4,311,326 A | 1/1982 | Ringle | |
| 4,905,731 A * | 3/1990 | Tamashiro | B25B 13/48 |
| | | | 7/164 |
| 5,301,575 A | 4/1994 | Mehlau | |
| 5,816,281 A | 10/1998 | Mixon | |
| 9,987,731 B2 * | 6/2018 | Chuang | B25B 23/108 |
| 11,065,741 B2 * | 7/2021 | Dahl | B60T 17/222 |
| 2006/0060261 A1 | 3/2006 | Awad | |
| 2020/0114494 A1* | 4/2020 | Dahl | B25B 13/04 |

* cited by examiner

BRAKE BLEEDING SCREW AND TOOL WITH QUICK-CONNECT FITTINGS

CROSS-REFERENCE TO RELATED APPLICATION

For purposes of the United States, the present application is a U.S. national phase patent application of, and claims priority to, International Application No. PCT/US2020/014628 filed on 22 Jan. 2020 and U.S. pro-visional patent application Ser. No. 62/795,409, filed Jan. 22, 2019, in which both applications are incorporated by reference herein in their entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to the process of bleeding a hydraulic system, and, in particular, to hand tools and bleeder screws for bleeding a brake system.

Background

FIG. 1A is a schematic illustration of a portion of a hydraulic brake system. As illustrated generally therein, a brake pedal is pushed against a master cylinder, hydraulic fluid supplied by a fluid reservoir is routed to a friction brake on a wheel by a brake line that may include hard line and flex line components. Other wheels and their brakes are likewise connected to the master cylinder via further brake lines.

When air (or perhaps more commonly, fluid vapor) becomes trapped within a brake line, the line needs to be "bled." For this purpose, bleed screws (and the access holes or valves into which they are threaded) are provided in one or more locations, such as adjacent each brake in the system. A bleed screw conventionally includes an axial bore through most of its length. The bore connects to small openings near the distal end of the screw and is open to the environment at its proximal end.

Conventionally, each bleed screw in a system is loosened slightly, one by one, while applying pressure via the brake pedal or other means, thereby causing fluid to squirt out through the proximal end of the bleed screw. Because brake fluid is highly corrosive, the end of a waste line is usually fitted to the open end of the bleed screw to receive the fluid, with the other end of the waste line being routed to a collection reservoir as shown in FIG. 1B. If air or vapor (referred to generally herein as "air") is present in the line, the fluid that is expelled will include air bubbles. Once the air is removed, but while maintaining pressure in the line via the brake pedal or the like, the bleed screw is retightened. The process is generally repeated on each brake line, often in a designated sequence, until all air has been removed.

Although highly conventional, the brake bleeding process is not without challenges. In particular, available space around bleed screws (i.e., the area shown in broken line in FIG. 1B) is often limited, making access to bleed screws can be very confined. Thus, it can be difficult to maneuver a wrench into place on the screw and then turned to loosen the screw. Even where the screw is relatively accessible, it may still be inconvenient to manage the process of maneuvering the wrench into place, turning the screw, removing the wrench, attaching the waste line, maneuvering the wrench back into place, tightening the screw back, and the like.

Bleed screws themselves suffer from a drawback that they are not adapted for use with "quick connect"-type tools. This is due in part to the fact that the fluid that is expelled through the proximal end must be captured, and a special "mushroom head"-type fitting is typically provided there to facilitate attachment of the waste line thereto. Unfortunately, this fitting is not compatible with quick connect tools.

Thus, a need exists for improvements in brake bleeding tools and/or bleed screws for use in the brake bleeding process.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of bleeding automotive brakes, the present invention is not limited to use only in bleeding automotive brakes, as will become apparent from the following summaries and detailed descriptions of aspects, features, and one or more embodiments of the present invention.

Broadly defined, the present invention according to one aspect relates to a tool for bleeding brakes as shown and/or described.

Broadly defined, the present invention according to another aspect relates to a method for bleeding brakes as shown and/or described.

Broadly defined, the present invention according to another aspect relates to a bleed screw as shown and/or described.

Broadly defined, the present invention according to another aspect relates to a tool for bleeding brakes, including: a primary assembly having a hollow central shaft, a female quick-connect fitting, and a socket wrench at a distal end of the central shaft; a quick-connect actuator assembly in operative relationship with the female quick-connect fitting; and a nozzle fitting, adapted to receive an end of a brake fluid waste line, at a proximal end of the central shaft and in fluid communication with the socket wrench via the hollow central shaft; wherein the quick-connect actuator assembly may be manipulated, with the socket wrench fitted around a hex fitting on a bleed screw, to receive and retain the bleed screw; and wherein the socket wrench may be turned, with the socket wrench, to loosen the bleed screw, thereby causing brake fluid and air bubbles to flow from a brake system into the bleed screw and from the bleed screw into the socket wrench and on to the nozzle fitting via the hollow central shaft.

In features of this aspect, the tool further includes a check valve interposed in the primary assembly between the female quick-connect fitting and the nozzle fitting; the check valve is opened when the bleed screw is fully received in the female quick-connect fitting; the nozzle fitting includes a mushroom-type head for connection to an open end of the brake fluid waste line; the primary assembly includes a handle extending generally perpendicularly from the central shaft at a point adjacent the nozzle fitting; the quick-connect actuator assembly includes a grip for manipulation thereof; and/or the grip is a T-grip that may be squeezed toward the handle of the primary assembly to actuate the quick-connect actuator assembly.

Broadly defined, the present invention according to another aspect relates to a bleed screw, including: a hollow shaft including a threaded portion; a tapered tip at a distal end of the hollow shaft; a cross bore near the distal end of the hollow shaft in fluid communication with an interior of the shaft; a male quick-connect fitting at a proximal end of the hollow shaft; and a hex fitting around the exterior of the hollow shaft and interposed between the male quick-connect fitting and the threaded portion.

Broadly defined, the present invention according to another aspect relates to an interoperable tool and bleed screw, including: a bleed screw, including (i) a hollow shaft whose exterior includes a threaded portion, (ii) a tapered tip at a distal end of the hollow shaft, (iii) a cross bore near the distal end of the hollow shaft in fluid communication with an interior of the shaft, (iv) a male quick-connect fitting at a proximal end of the hollow shaft, and (v) a structural fitting around the exterior of the hollow shaft and adapted to be manipulated to alternatively tighten and loosen the bleed screw; a tool for bleeding a hydraulic system, including (i) a primary assembly having a hollow central shaft, a female quick-connect receptacle for receiving and releasably retaining the male quick-connect fitting of the bleed screw, and a socket wrench at a distal end of the primary assembly, (ii) a quick-connect actuator assembly in operative relationship with the female quick-connect receptacle, and (iii) a nozzle fitting, adapted to receive an end of a hydraulic fluid waste line, that is in fluid communication, via the hollow central shaft, with an interior of the socket wrench; wherein the quick-connect actuator assembly may be manipulated, with the socket wrench positioned around the structural fitting on the bleed screw, such that the bleed screw is received and retained in the female quick-connect receptacle or is alternatively released from the female quick-connect receptacle; and wherein the bleed screw may be turned, with the socket wrench, to loosen the bleed screw and thereby open a fluid passage into the bleed screw such that hydraulic fluid and air bubbles may flow from a hydraulic system into the bleed screw and on through the central shaft to the nozzle fitting.

Broadly defined, the present invention according to another aspect relates to a tool for bleeding a hydraulic system, including: a primary assembly having a hollow central shaft, a female quick-connect receptacle for receiving and releasably retaining a male quick-connect fitting at a proximal end of a bleed screw, and a socket wrench at a distal end of the primary assembly; a quick-connect actuator assembly in operative relationship with the female quick-connect receptacle; and a nozzle fitting, adapted to receive an end of a hydraulic fluid waste line, that is in fluid communication, via the hollow central shaft, with an interior of the socket wrench; wherein the quick-connect actuator assembly may be manipulated, with the socket wrench positioned around a corresponding structural fitting on a bleed screw, such that the bleed screw may be received and retained in the female quick-connect receptacle or alternatively may be released from the female quick-connect receptacle; and wherein the bleed screw may be turned, with the socket wrench, to loosen the bleed screw and thereby open a fluid passage into the bleed screw such that hydraulic fluid and air bubbles may flow from a hydraulic system into the bleed screw and on through the central shaft to the nozzle fitting.

In a feature of this aspect, the quick-connect actuator assembly includes a sleeve around the female quick-connect receptacle, the sleeve and the receptacle are part of a female quick-connect fitting that further includes a ring of movable balls set in openings in a wall of the female quick-connect receptacle and that are alternatively forced inward or allowed to move outward depending on a position of the sleeve around an outside of the female quick-connect receptacle. In further features, the sleeve of the quick-connect actuator assembly is biased to a position that forces the movable balls inward to retain the bleed screw within the female quick-connect receptacle; the tool further includes a compression spring that biases the sleeve of the quick-connect actuator assembly to the position that forces the movable balls inward; the compression spring is disposed at an upper end of the central shaft; and/or the tool further includes a check valve interposed in the primary assembly between the female quick-connect receptacle and the nozzle fitting.

In another feature of this aspect, the check valve is opened when the bleed screw is fully received in the female quick-connect receptacle. In a further feature, the check valve is held open by the proximal end of the bleed screw when the bleed screw is fully received in the female quick-connect receptacle.

In another feature of this aspect, the nozzle fitting is disposed at a proximal end of the primary assembly. In further features, the nozzle fitting is a separable component that is threaded onto a proximal end of the hollow central shaft; the nozzle fitting is integral with a proximal end of the hollow central shaft; and/or the nozzle fitting includes a mushroom-type head for connection to an open end of the brake fluid waste line.

In another feature of this aspect, the primary assembly includes a handle extending generally perpendicularly from the central shaft at a point adjacent the nozzle fitting. In further features, the quick-connect actuator assembly includes a grip for manipulation thereof; the grip is located near a proximal end of the central shaft of the primary assembly; the grip is a T-grip that may be squeezed toward the handle of the primary assembly to actuate the quick-connect actuator assembly; and/or the T-grip extends beneath, and in parallel to, the handle of the primary assembly.

In another feature of this aspect, the socket wrench is a hex socket wrench that is adapted to fit around a corresponding hex fitting on the bleed screw.

In another feature of this aspect, the tool further includes an O-ring arranged inside and at a proximal end of the female quick-connect receptacle to seal against an annular shoulder of the proximal end of the bleed screw when the bleed screw is retained in the female quick-connect receptacle.

Broadly defined, the present invention according to another aspect relates to a tool for bleeding a hydraulic system, including: a primary assembly having a hollow central shaft, elements of a female quick-connect fitting, and a socket wrench at a distal end of the central shaft; a quick-connect actuator assembly in operative relationship with the elements of the female quick-connect fitting; and a nozzle fitting, adapted to receive an end of a hydraulic fluid waste line, at a proximal end of the central shaft and in fluid communication with an interior of the socket wrench via the hollow central shaft; wherein the quick-connect actuator assembly may be manipulated, with the socket wrench positioned around a fitting on a bleed screw, such that the bleed screw may be received and retained by the female quick-connect fitting or alternatively may be released from the female quick-connect fitting; and wherein the bleed screw may be turned, with the socket wrench, to loosen the bleed screw and thereby open a fluid passage into the bleed screw such that hydraulic fluid and air bubbles may flow from a hydraulic system into the bleed screw and on through the central shaft to the nozzle fitting.

In a feature of this aspect, the tool further includes a check valve interposed in the primary assembly between the female quick-connect fitting and the nozzle fitting. In a further feature, the check valve is opened when the bleed screw is fully received in the female quick-connect fitting.

In another feature of this aspect, the nozzle fitting includes a mushroom-type head for connection to an open end of the hydraulic fluid waste line.

In another feature of this aspect, the primary assembly includes a handle extending generally perpendicularly from the central shaft at a point adjacent the nozzle fitting. In further features, the quick-connect actuator assembly includes a grip for manipulation thereof; and/or the grip is a T-grip that may be squeezed toward the handle of the primary assembly to actuate the quick-connect actuator assembly.

Broadly defined, the present invention according to another aspect relates to a bleed screw, including: a hollow shaft whose exterior includes a threaded portion; a tapered tip at a distal end of the hollow shaft; a cross bore near the distal end of the hollow shaft in fluid communication with an interior of the shaft; a male quick-connect fitting at a proximal end of the hollow shaft; and a structural fitting around the exterior of the hollow shaft and adapted to be manipulated with a wrench to alternatively tighten and loosen the bleed screw.

In a feature of this aspect, the structural fitting is interposed between the male quick-connect fitting and the threaded portion. In further features, the male quick-connect fitting includes an annular detent groove extending around the outside of the hollow shaft; the proximal end of the hollow shaft includes first and second sections with the annular detent groove interposed therebetween, and wherein the first and second sections have approximately the same cross-section; an annular shoulder is arranged around the outside of the hollow shaft to mate with an O-ring in a bleed screw tool; the structural fitting around the exterior of the hollow shaft is a hex fitting; the cross bore penetrates an unthreaded portion of the hollow shaft; and/or the cross bore penetrates the threaded portion of the hollow shaft.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1A:
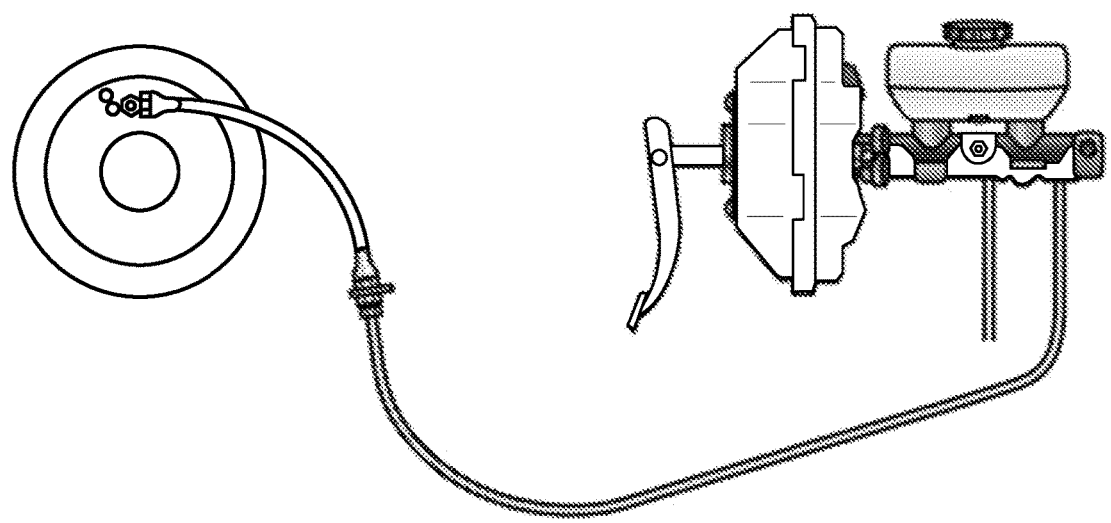
FIG. 1A is a schematic illustration of a portion of a hydraulic brake system.
Figure 1B:
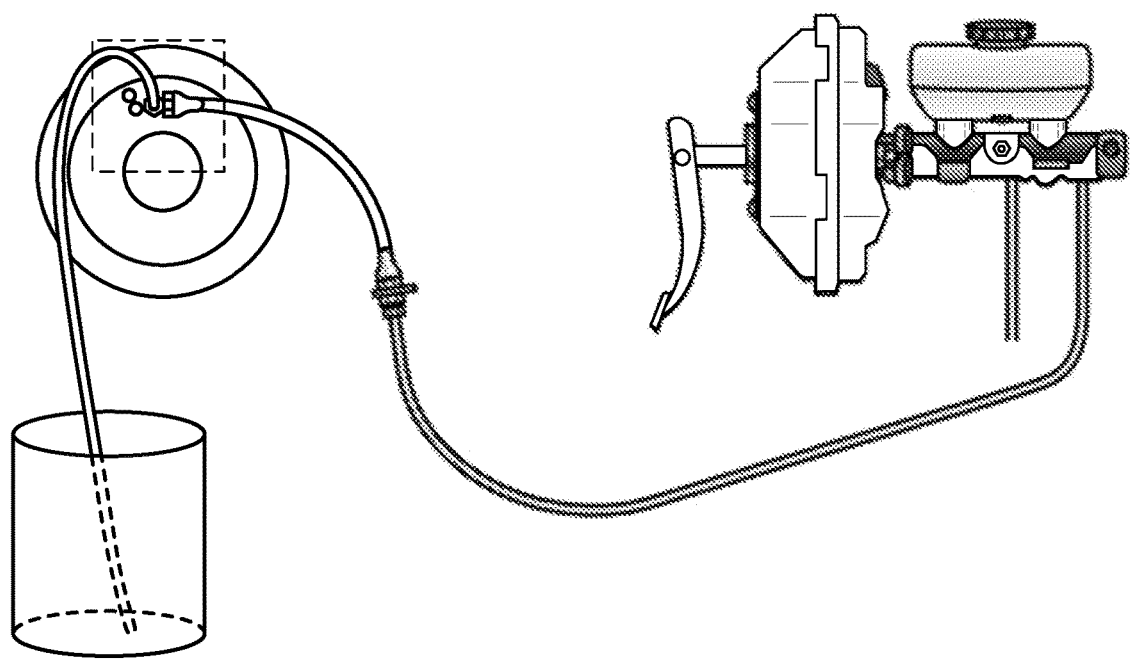
FIG. 1B is a schematic illustration of a prior art brake bleeding system.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
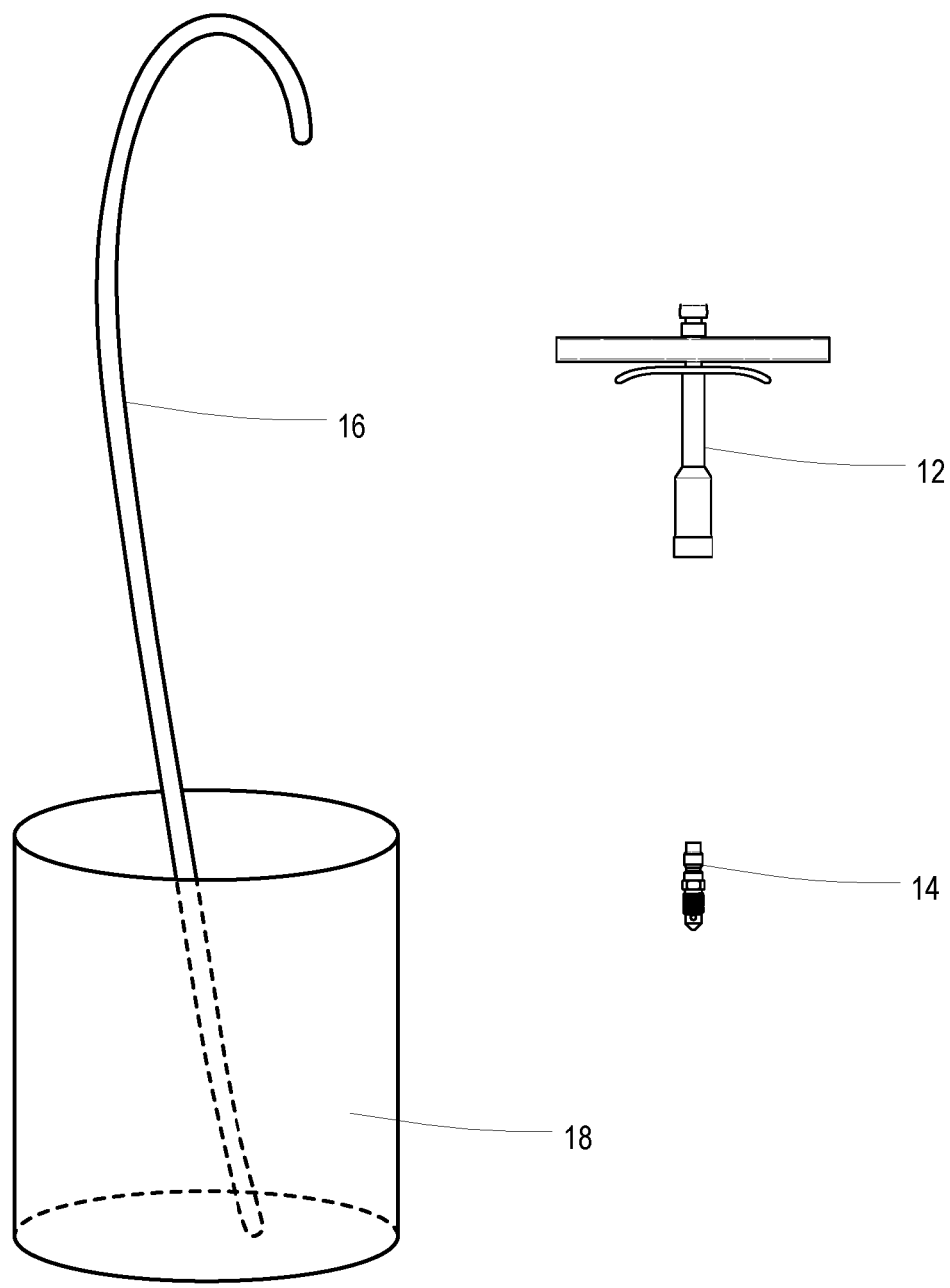
FIG. 2 is an apparatus for bleeding a brake line in accordance with one or more preferred embodiments of the present invention.

FIG. 2 is an apparatus 10 for bleeding a brake line in accordance with one or more preferred embodiments of the present invention. As shown therein, the apparatus includes a quick-connect bleeder tool 12, a quick-connect bleed screw 14, a waste line 16, and a waste receptacle 18. The bleed screw 14 is threaded into a corresponding opening in a brake caliper. In at least some embodiments, the waste line 16 and waste receptacle 18 are conventional, although in other embodiments, one or more of which may be described herein, one or both the waste line and waste receptacle may include further inventive features.

Figure 3:
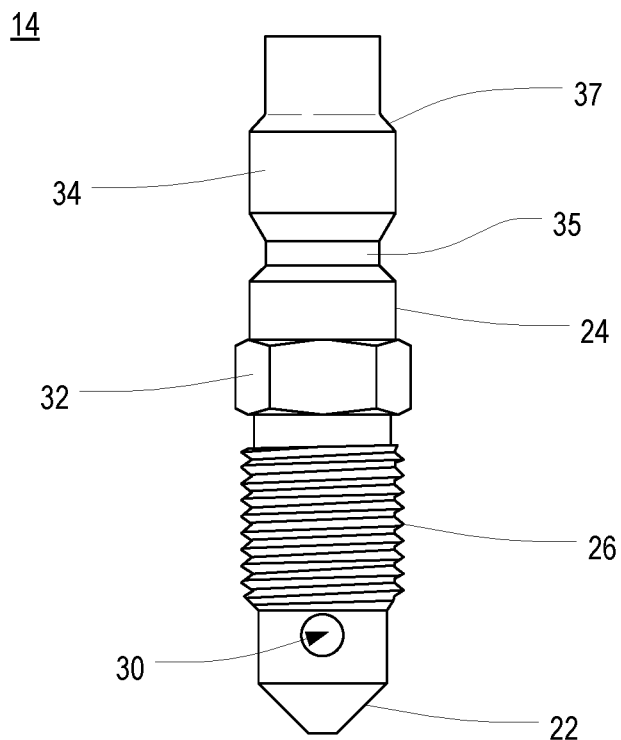
FIG. 3 is a side view of the quick-connect bleed screw of FIG. 2.
Figure 4:
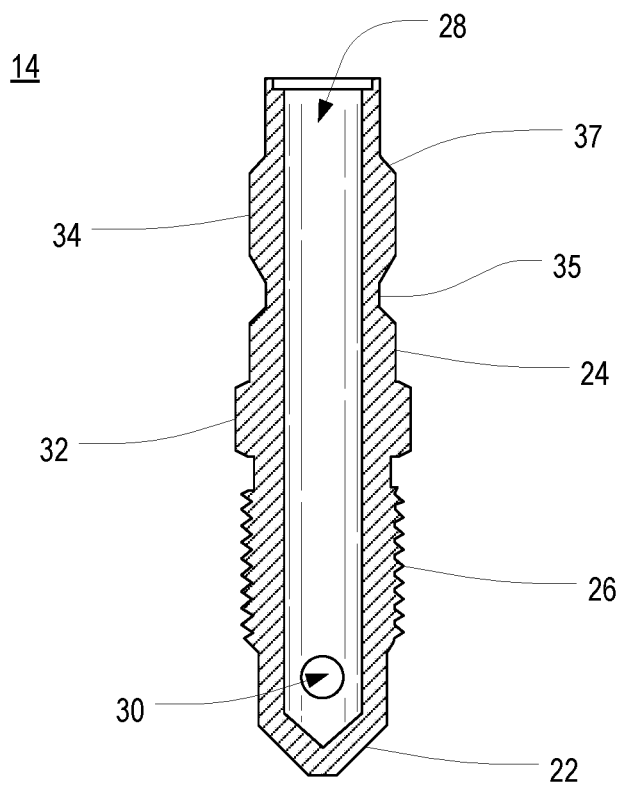
FIG. 4 is a side cross-sectional view of the quick-connect bleed screw of FIG. 2.

FIGS. 3 and 4 are a side view and a side cross-sectional view, respectively, of the quick-connect bleed screw 14 of FIG. 2. As shown therein, the quick-connect bleed screw 14 includes a tapered tip 22 at a distal end thereof, a hollow shaft 24 having a threaded portion 26 and an internal passage 28, a cross bore 30 in fluid communication with the internal passage 28, a hex fitting 32, and a male quick-connect fitting 34 at a proximal end. The hex fitting 32 may be of generally conventional size, shape, and construction, although in alternative embodiments other arrangements may be used (for example, a square fitting) so long as the quick-connect bleeder tool 12 is likewise modified. As perhaps best shown in FIG. 3, the quick-connect fitting 34 includes a detent groove 35 to receive a plurality of spherical balls (described below) arranged in a ring, similar to quick-connect fittings widely used for fluid and pressure connections. The groove 35 is shown with angled sides but may alternatively have other shapes, such as curved walls. In at least some embodiments, the cross-section of the quick-connect fitting 34 is preferably substantially the same just above and below the groove 35.

The upper end of the quick-connect fitting 34 is arranged to seal within a corresponding female quick-connect fitting (described below). In the illustrated embodiment, an annular shoulder 37 is provided around the proximal (upper) end of the bleed screw 14 to abut a seal in the bleeder tool 12 as described below. The internal passage 28 extends from the upper end down through the quick-connect fitting 34 and out to the environment via the cross bore 30. It will be appreciated that various arrangements of cross bores (which in some embodiments need not be perpendicular), threads, and taper are possible without departing from the scope of the present invention. The structure of the bleed screw 14 from the hex fitting 32 to the tapered tip 22 may, in some embodiments, be generally conventional, but provision of the quick-connect fitting helps provide functionality not previously possible. Furthermore, although the bleed screw 14 shown in FIGS. 3 and 4 may be of a relatively standard size, some embodiments of such a screw 14 utilize nonstandard lengths (particularly lengths that are shorter than conventional bleed screws), diameters, and thread geometry. In some embodiments, bleed screws 14 having different thread geometries may all be provided with the same hex fitting 32 such that the same tool 12 may be used on differently-threaded bleed screws 12. In at least some embodiments, the bleed screw 14 utilizes AN construction.

Figure 5:
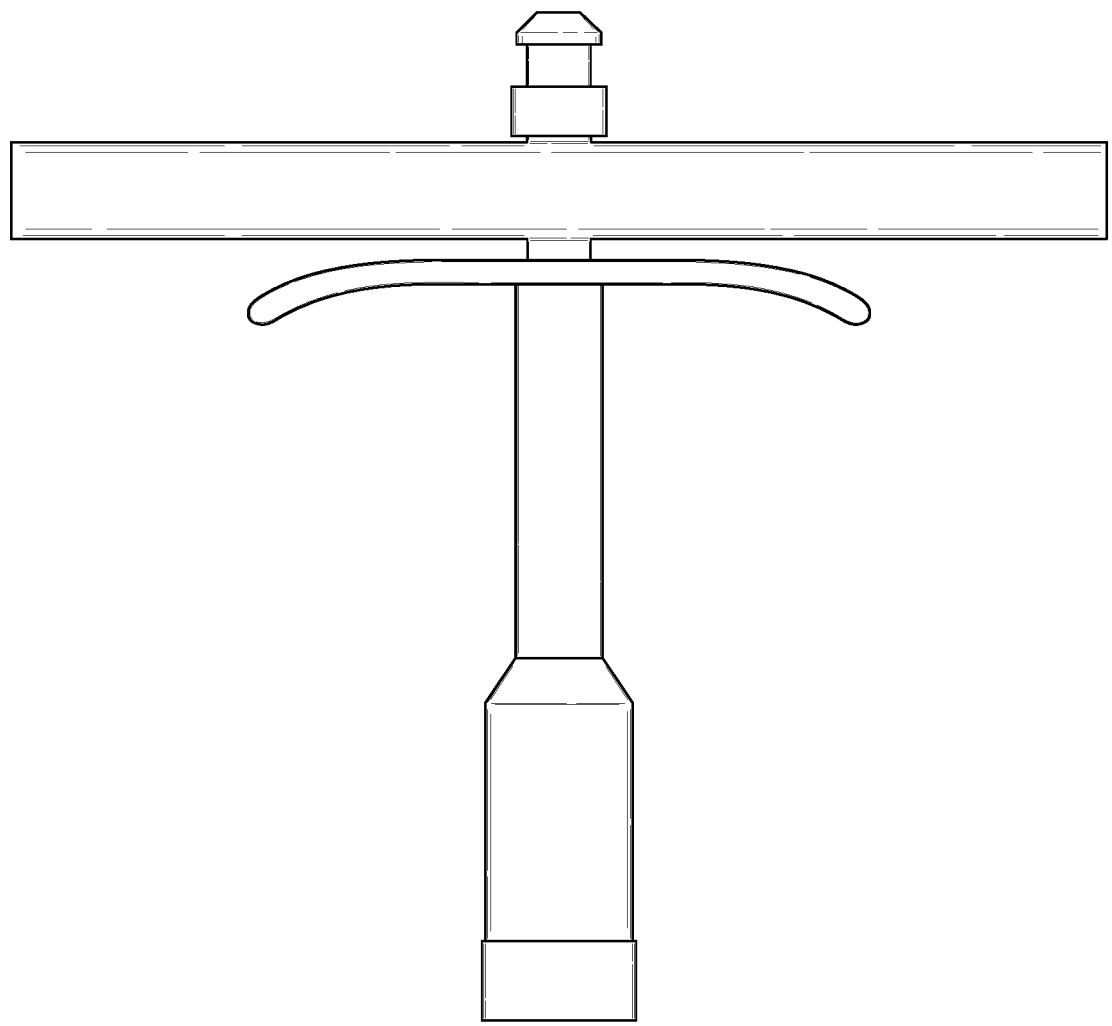
FIG. 5 is a side view of the quick-connect bleeder tool of FIG. 2.
Figure 6:
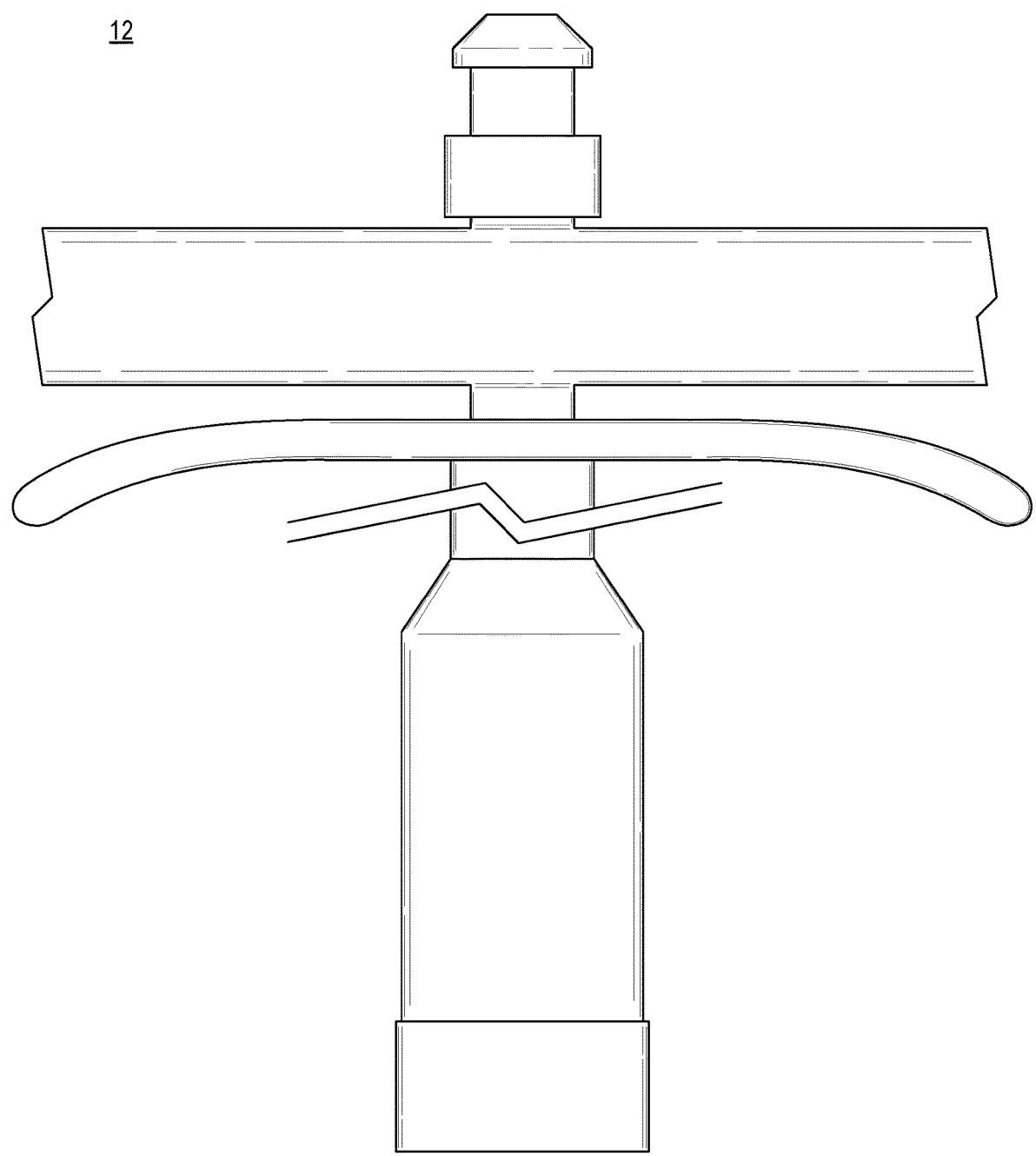
FIG. 6 is a fragmentary side view of the quick-connect bleeder tool of FIG. 2.
Figure 7:
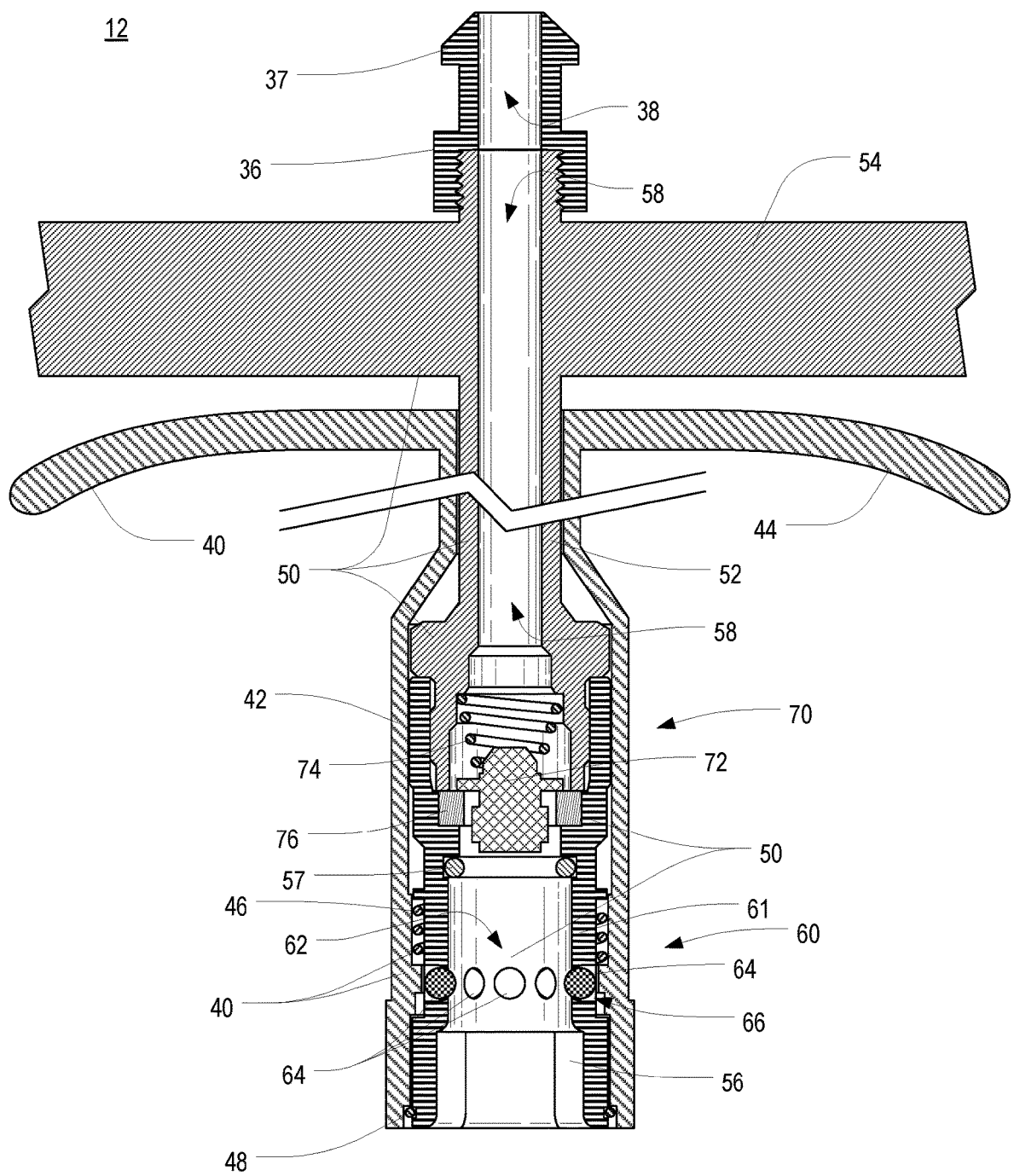
FIG. 7 is a fragmentary side cross-sectional view of the quick-connect bleeder tool of FIG. 2.

FIGS. 5, 6, and 7 are a side view, a fragmentary side view, and a fragmentary side cross-sectional view, respectively, of the quick-connect bleeder tool 12 of FIG. 2. As shown therein, the tool 12 includes a primary assembly 50, a quick-connect actuator assembly 40, and a nozzle fitting 36. The primary assembly 50 includes a central shaft 52 having a perpendicular handle 54 near its proximal end and a set of operational components at or near its distal end. The quick-connect actuator assembly 40 surrounds most of the central shaft 52 between the distal end of the shaft 52 and the perpendicular handle 54. The nozzle fitting 36, shown with a conventional mushroom head 37, is shown disposed at the proximal end of the shaft 52, but may in some cases be located elsewhere. Furthermore, the nozzle fitting 36 is shown as being a separate component that is threaded onto the proximal end of the central shaft 52, but the nozzle fitting 36 may in some cases be attached in a different manner, or may be integral with the central shaft 52. As shown in FIG. 7, the nozzle fitting 36 and the central shaft 52 each include a respective coaxial passage 38,58 extending longitudinally therethrough, wherein the coaxial passages 38,58 are in fluid communication with each other.

As perhaps best shown in FIG. 7, the primary assembly 50 includes a socket wrench 56 at its distal end, elements of a female quick-connect fitting 60 immediately proximate from the socket wrench 56, and a check valve assembly 70 immediately proximate from the quick-connect fitting 60. In the illustrated embodiment, the socket wrench 56 is a hex wrench whose dimensions correspond to those of the hex fitting 32 on the bleed screw 14. However, it will be appreciated that the dimensions and even the shape of the socket wrench may be changed to match the size and shape of the male quick-connect fitting on the bleed screw 14 (for example, utilizing a square fitting instead of a hex fitting). Furthermore, in some embodiments, quick-connect bleed screws of otherwise different dimensions may all be provided with a male quick-connect fitting of a uniform size such that differently-sized bleed screws may all be turned with a single-sized tool 12.

The interior of the socket wrench 56 is in fluid communication with the internal passage 58 of the central shaft 52 via the interior of the female quick-connect fitting 60 and the check valve assembly 70. As noted previously, the internal passage 25 of the central shaft 52 is in fluid communication with the internal passage 38 of the nozzle 36. Thus, the interior of the socket wrench 56 is in indirect fluid communication with the internal passage 38 of the nozzle 36 as well.

In some embodiments, the female quick-connect fitting 60 is generally conventional in construction. At least some of these embodiments include a main body 61 forming a cylindrical receptacle 62 having a group of metal balls 64 disposed circumferentially in holes 66 around the interior periphery thereof. The holes 66 are tapered to reduce their diameter at the inner surface of the receptacle 62. As with conventional quick-connect fittings, the female quick-connect fitting 60 includes a sleeve, which in this a portion of the sleeve 42 of the quick-connect actuator assembly 40, that alternatively either forces the balls 64 inward or allows them to move outward, depending on its position on the central shaft 52. The position of the balls 64 controls whether the male quick-connect fitting 34 of the bleed screw 14 may be inserted into (or removed from) the fitting 60, or whether the bleed screw 14 may be removed once inserted. In other words, when the sleeve of the female quick-connect fitting 60 is moved upward (in the illustrated embodiment), the balls 64 are allowed to move outward, and the bleed screw 14 may be inserted or removed. On the other hand, when the sleeve of the female quick-connect fitting 60 is moved downward (in the illustrated embodiment), the balls 64 are forced inward, into the detent groove 35 of the quick-connect fitting 34 on the bleed screw 14, and the bleed screw 14 is retained in place. An O-ring or other seal is provided around the interior end of the fitting 60 so as to seal the proximal end of the bleed screw 14 when the screw is fully inserted therein.

The check valve assembly 70 is located at the interior end of the female quick-connect fitting 60, or above the quick-connect fitting 60 in the orientation shown in FIG. 7. The check valve assembly 70 includes a central body 72 that is biased toward the female quick-connect fitting 60 by a compression spring 74. A stop 76, preferably in the form of a seal, prevents further movement of the central body 72 toward or into the socket of the quick-connect fitting 60. The check valve assembly 70 is positioned such that full insertion of the bleed screw 14 into the female quick-connect fitting 60 causes the proximal end of the bleed screw 14 to make contact with the central body 72, thereby displacing it, compressing the spring 74, and creating an opening through the valve assembly 70 as further described hereinbelow.

In the illustrated embodiment, the socket wrench 56 is integral with the main body 61 of the female quick-connect fitting 60, and a distal end of the central shaft 52 is installed in a proximal end of the main body 61. Such an arrangement may be preferred for manufacturability, ease of service, or the like, but arrangements other than that shown are possible without departing from the scope of the present invention.

In the illustrated embodiment, the quick-connect actuator assembly 40 includes the sleeve 42, a T-grip actuator 44, a compression spring 46, and a removable stop 48. The sleeve 42 includes a distal (lower) portion and a proximal (upper) portion. The upper and lower portions of the sleeve 42 may be formed integrally or may be assembled, but together form a unitary body that may be translated a short distance along the primary assembly 50. Lower portions of the sleeve 42, the compression spring 46, and the removable stop 48 may utilize conventional construction, wherein the spring 46 biases the sleeve 42 toward the distal end of the primary assembly 50. The removable stop 48, which may be in the form of a metal ring, limits movement of the sleeve past the distal end of the primary assembly 50. The upper portion of the sleeve 42 extends upward along the central shaft 52 and terminates in the T-grip actuator 44, which is located in relatively close proximity to the handle 54 of the primary assembly 50. Movement of the sleeve 42 relative to the primary assembly 50 may thus be effectuated by gripping both the handle 54 and the T-grip actuator 44 and squeezing the T-grip actuator 44 toward the handle 54 with sufficient force to overcome the bias of the compression spring 46. When the T-grip actuator 44 is released, the sleeve 42 is biased back toward the distal end of the primary assembly 50.

Figure 8:
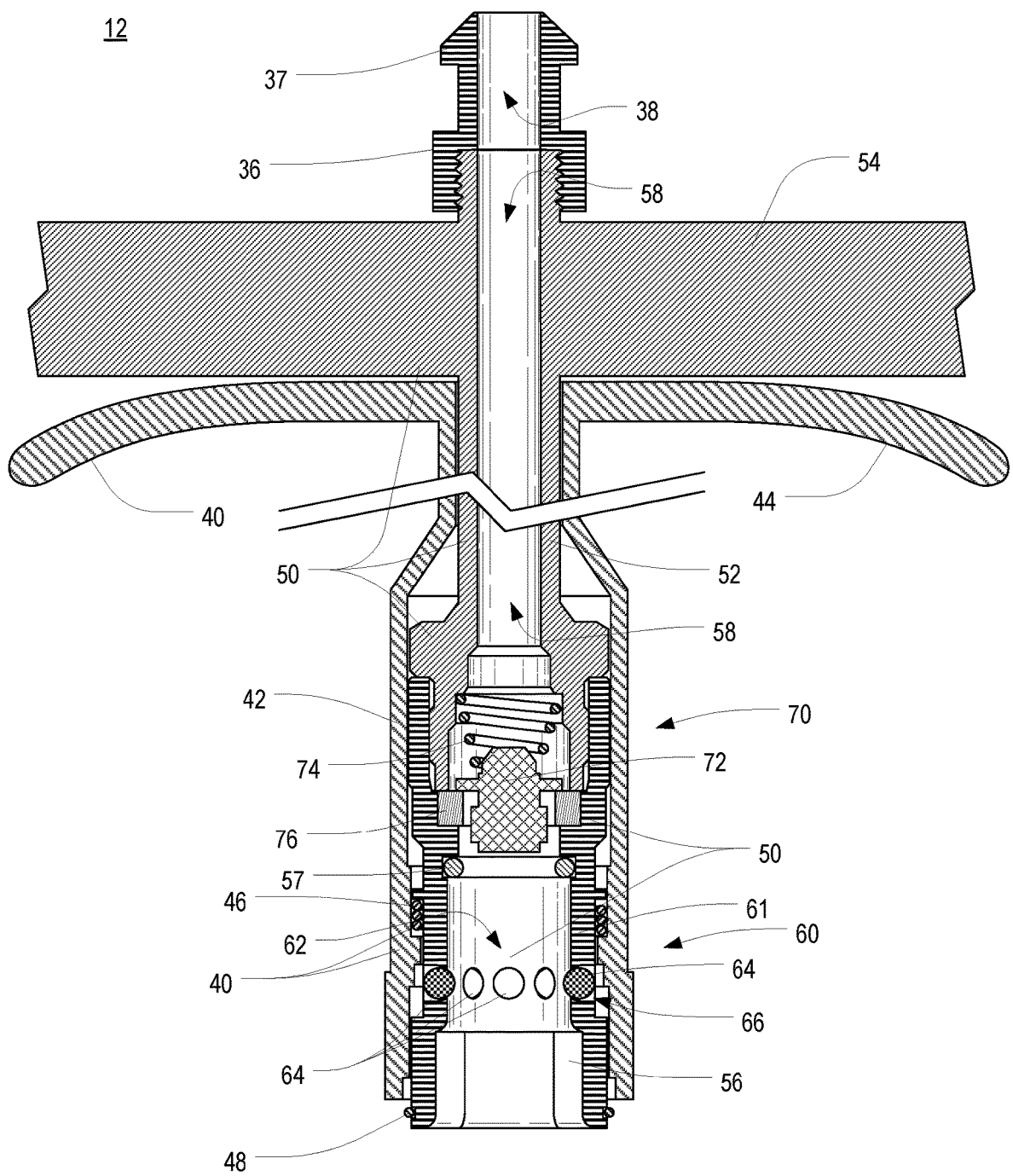
FIG. 8 is a fragmentary side cross-sectional view of the quick-connect bleeder tool of FIG. 7, shown with the T-grip actuator moved upward toward the handle.
Figure 9:
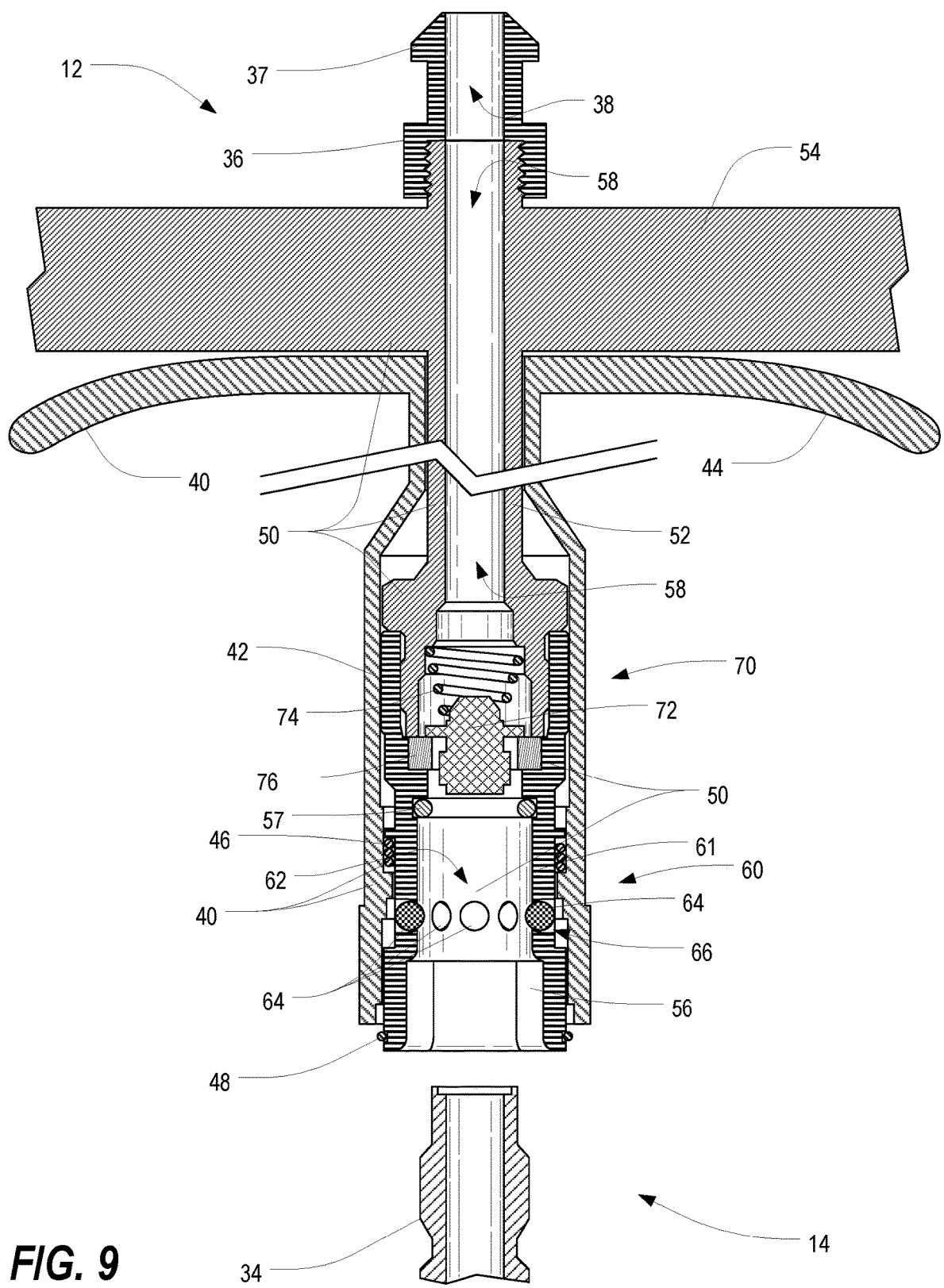
FIGS. 9-12 are fragmentary side cross-sectional views of the quick-connect bleeder tool of FIG. 8 illustrating the tool being maneuvered onto the proximal end of the bleed screw.
Figure 10:
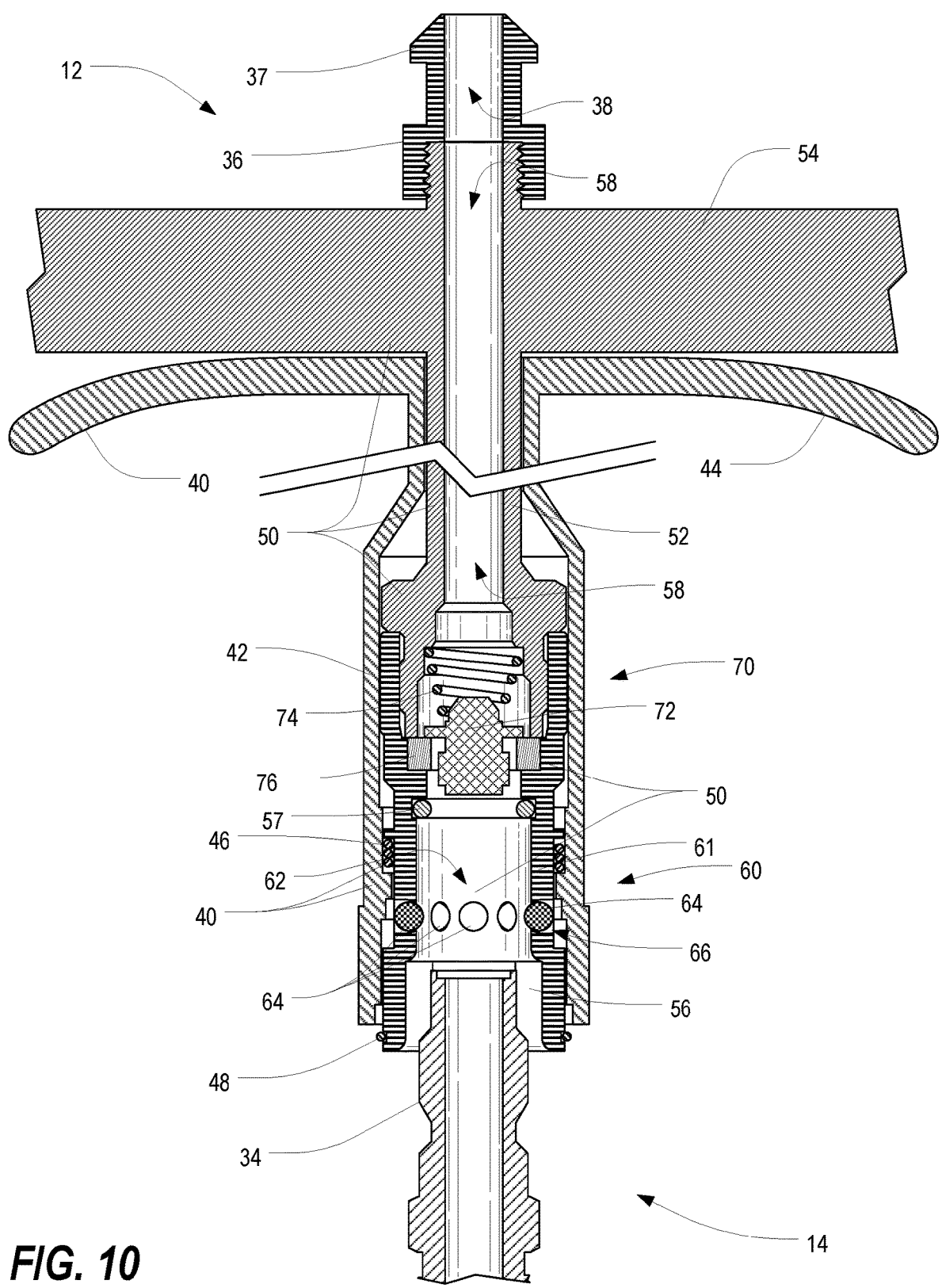
Figure 11:
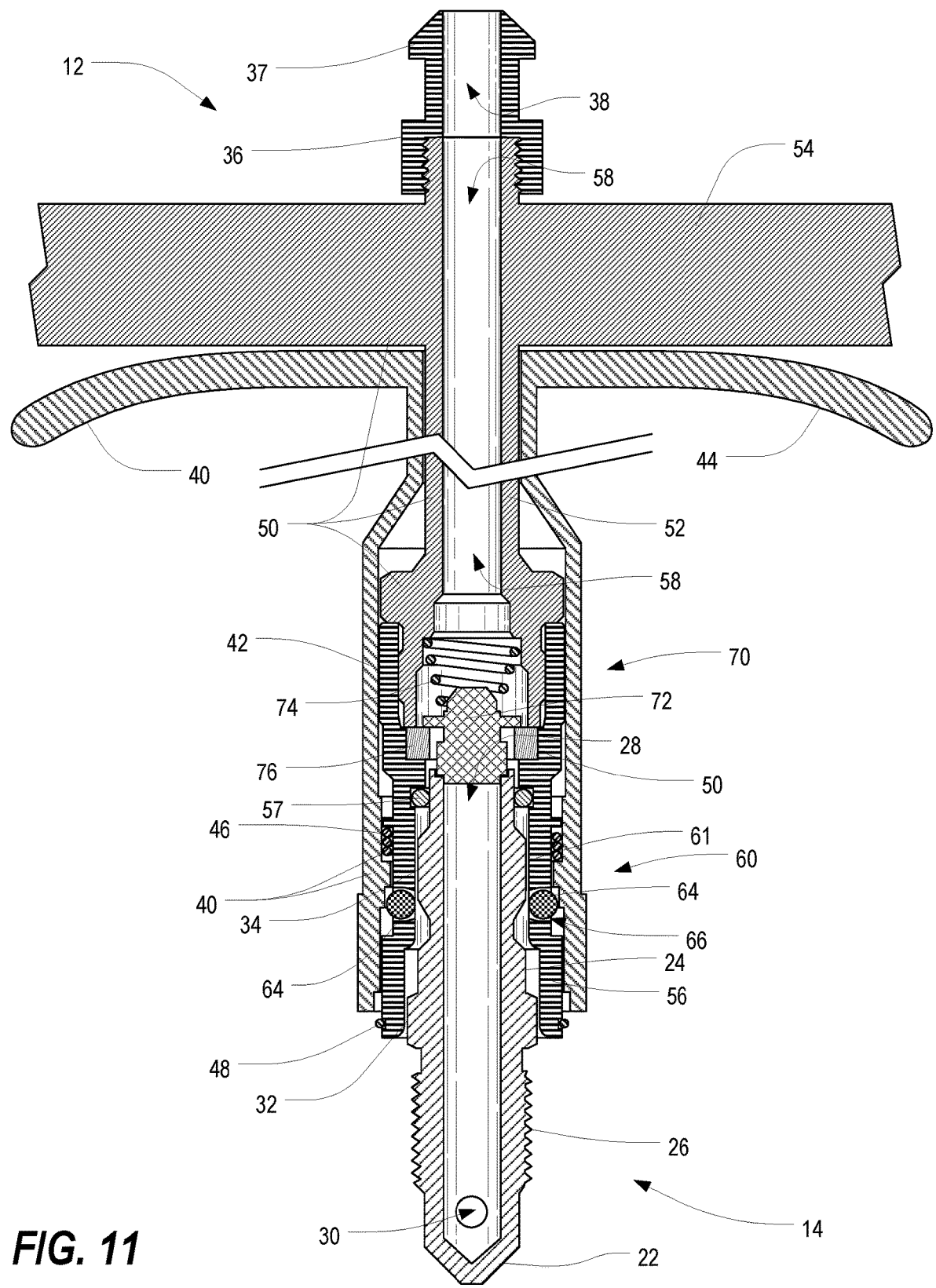
Figure 12:
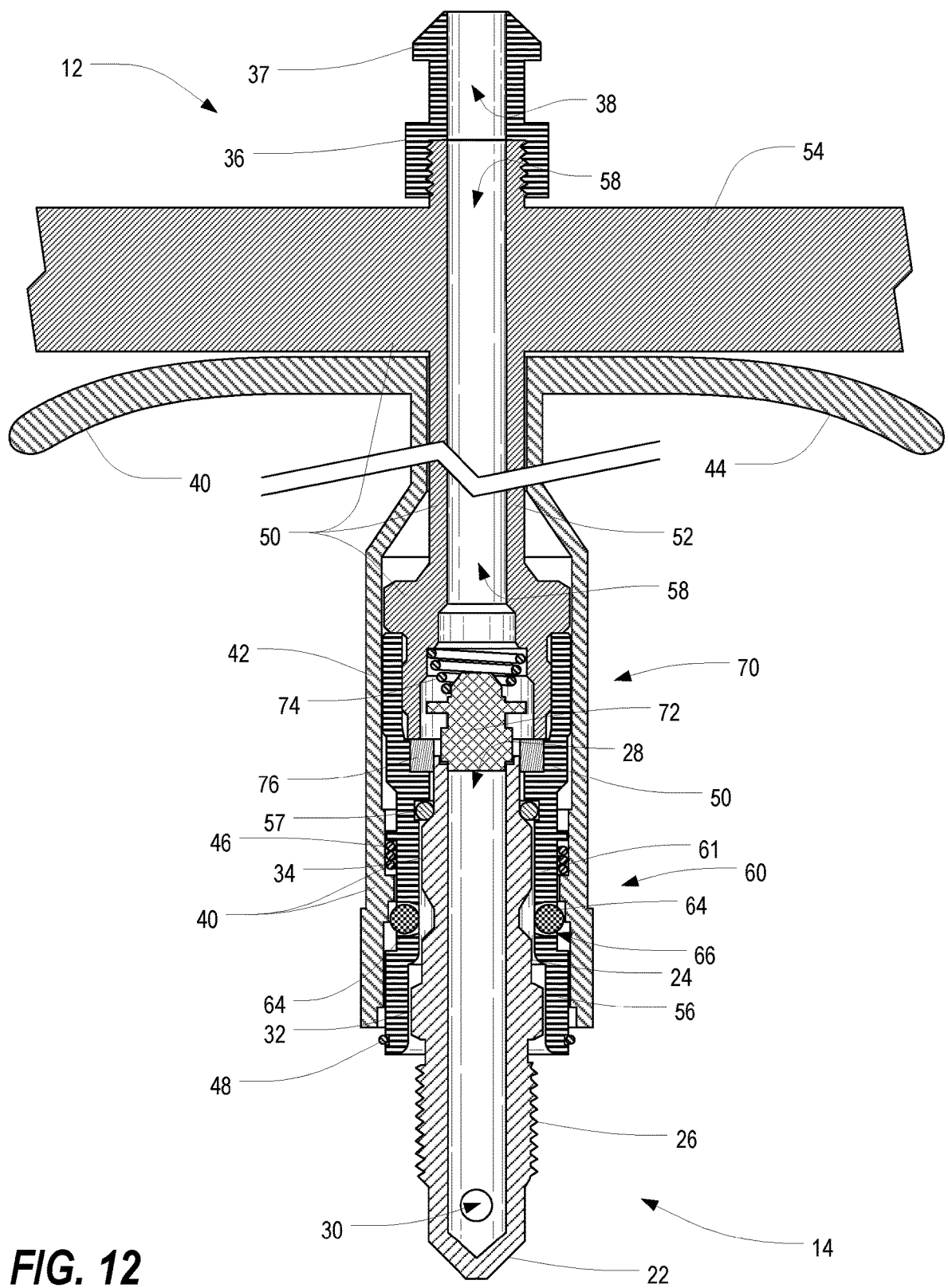
Figure 13:
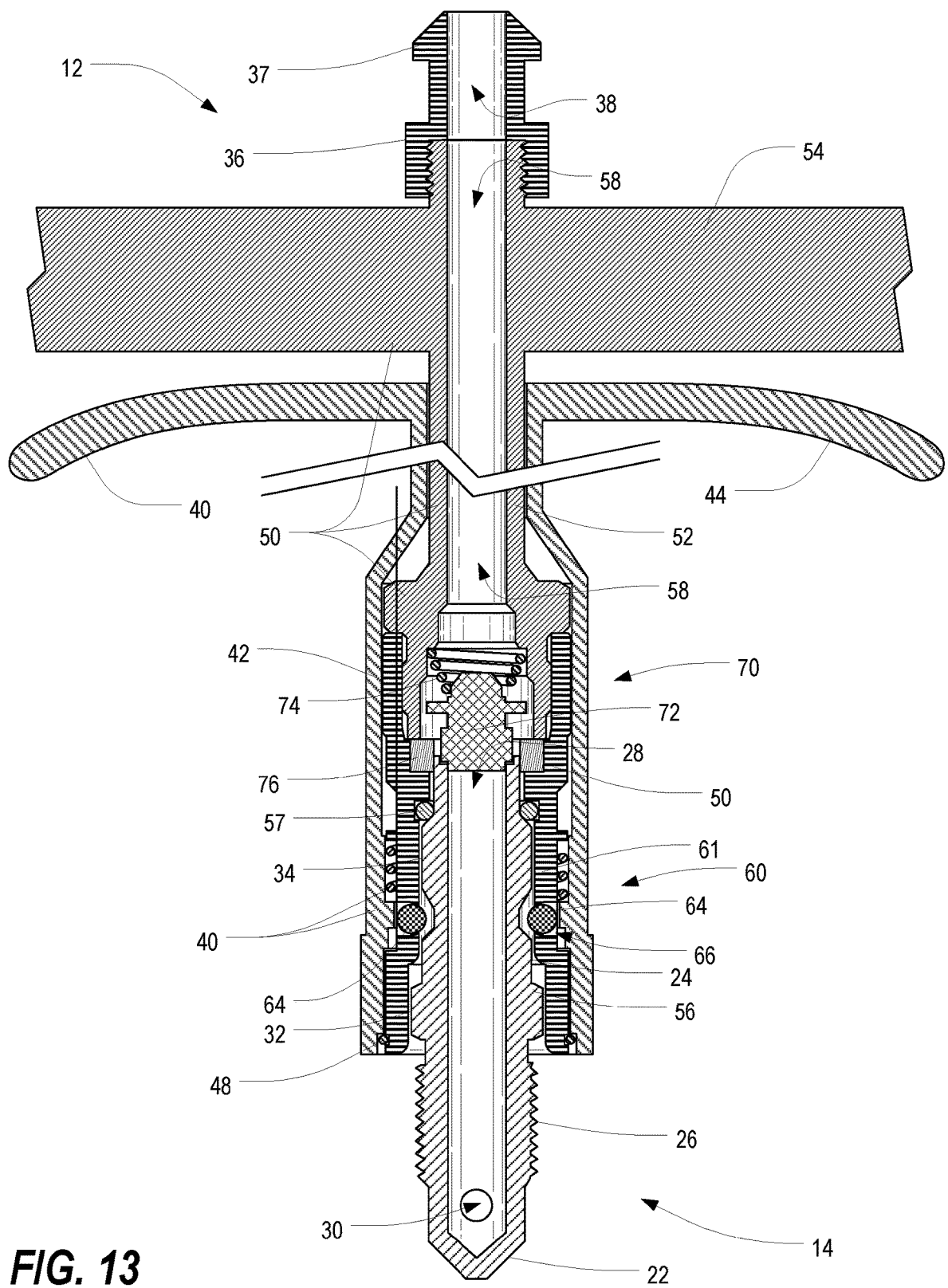
FIG. 13 is a fragmentary side cross-sectional view of the quick-connect bleeder tool of FIG. 12, shown with the T-grip actuator moved back downward to capture the bleed screw.

The tool 12 may be attached to the bleed screw 14 as shown in FIGS. 8-13, which are further fragmentary side cross-sectional views of the quick-connect bleeder tool 12 of FIG. 2. FIG. 7 shows the tool in its normal state, wherein the actuator sleeve 42 is biased toward the distal end of the primary assembly 50. In FIG. 8, the T-grip actuator 44 has been moved upward toward the handle 54, which may be accomplished, for example, by squeezing the actuator 44 and handle 54 together. This frees the balls 64 in the quick-connect fitting 60 to move outward. Thus, when the opening of the socket wrench 56 is maneuvered such that it fits around the proximal end of the bleed screw 14, as shown in FIGS. 9 and 10, the male quick-connect fitting 34 can, when sufficient force is applied to the tool 12, contact the balls 64 and force them apart, allowing the proximal end of the bleed screw 14 to make contact with the central body 72 of the check valve assembly 70 as shown in FIG. 11. At the same time, the socket wrench 64 fits over the hex fitting 32 of the screw 14. If an additional force, sufficient to overcome the bias of the check valve compression spring 74, is then applied to the tool 12, the central body 72 is forced upward and the check valve is opened, as shown in FIG. 12. In this state, the internal passage 58 of the central shaft 52 is in fluid communication with the internal passage 28 of the screw 14. The T-grip actuator 44 may then be released, as shown in FIG. 13, at which point the actuator compression spring 46 forces the sleeve 42 back downward. The internal surfaces of the sleeve 42 force the balls 64 back inward and hold them in place, thereby locking the balls 64 in place below the male quick-connect fitting 34 and retaining the bleed screw 14 within the tool 12. Once in this position, the proximal end of the bleed screw 14 is preferably sealed to avoid leakage around the outside of the screw 14. This may be accomplished via an O-ring 57 disposed at the upper end of the quick-connect receptacle that fits around the annular shoulder 37 at the top or proximal end of the bleed screw 14.

Figure 14:
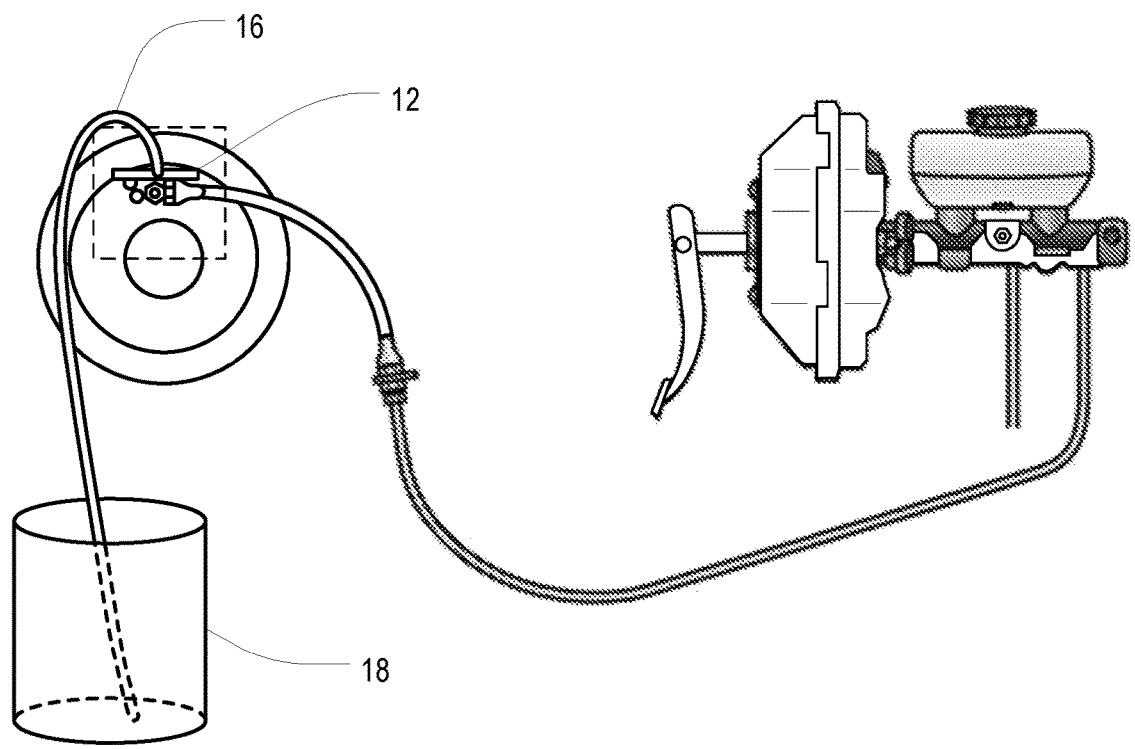
FIG. 14 is a partially schematic diagram illustrating the use of the tool and bleed screw of FIG. 2 with a brake system in accordance with one or more preferred embodiments of the present invention.
Figure 15A:
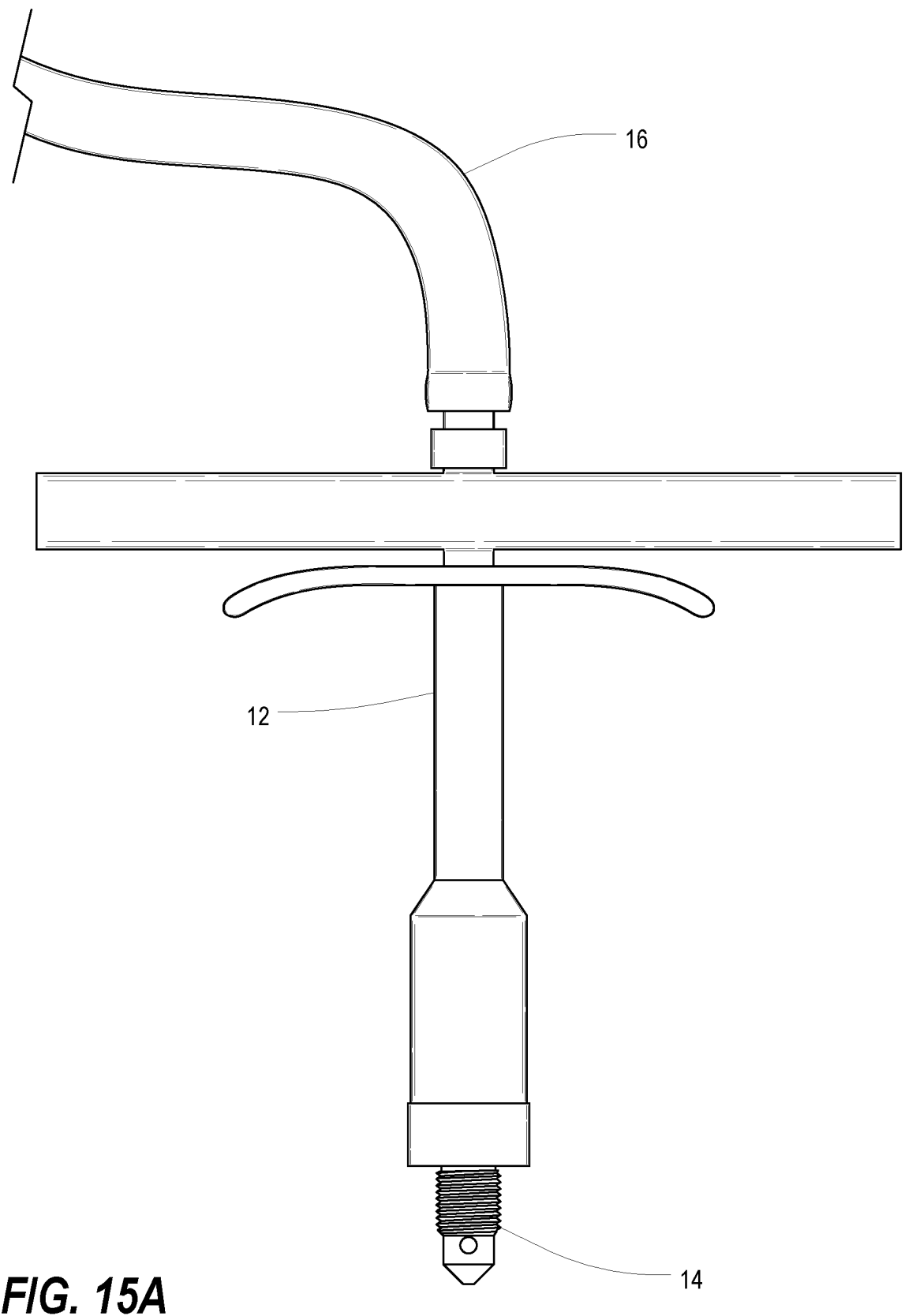
FIG. 15A is a fragmentary side view of the tool, bleed screw, and waste line of FIG. 14.
Figure 15B:
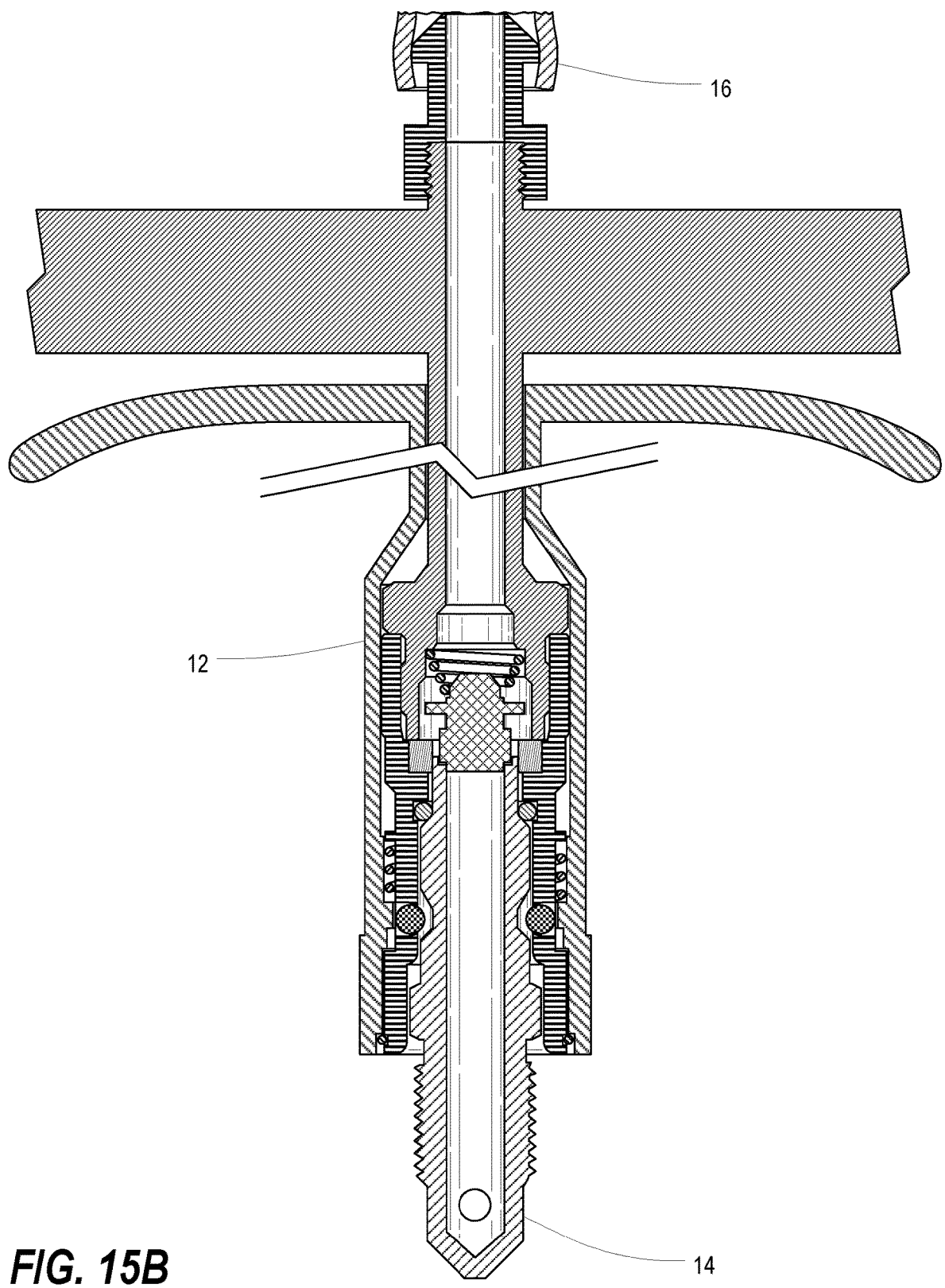
FIG. 15B is a fragmentary side cross-sectional view of the tool, bleed screw, and waste line of FIG. 15A.
Figure 16:
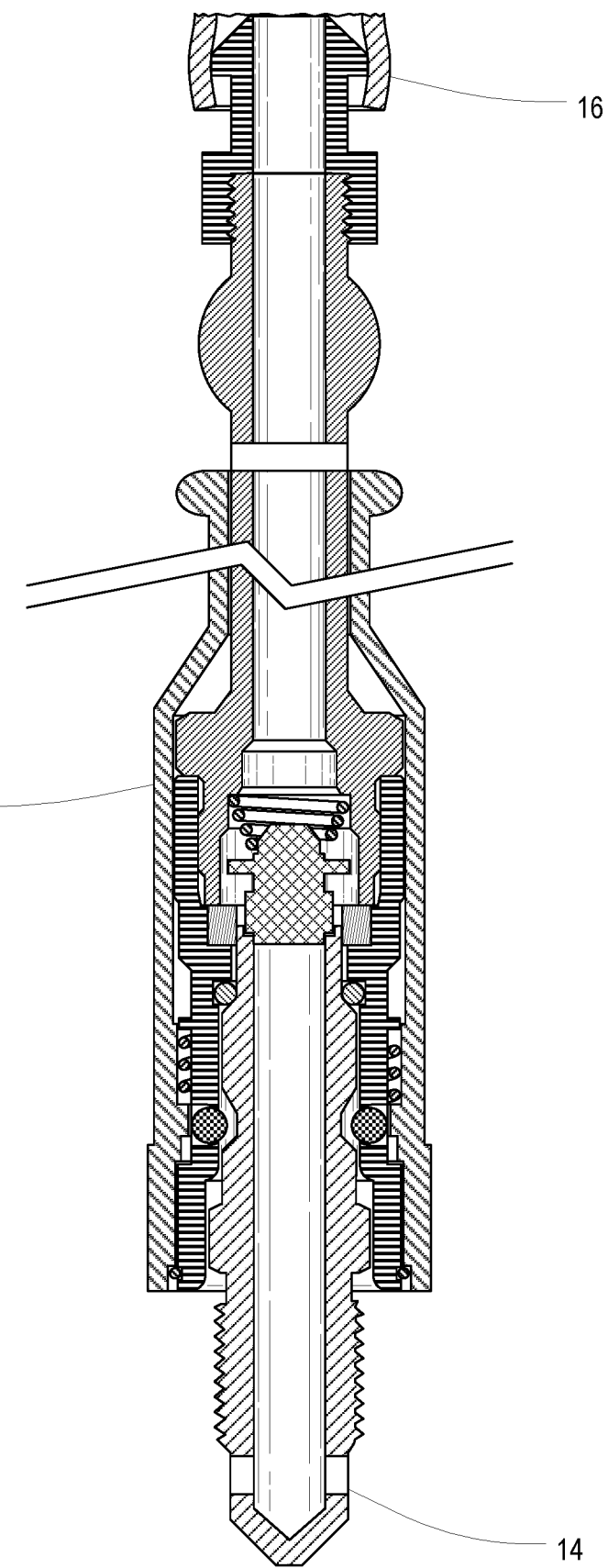
FIG. 16 is a fragmentary side cross-sectional view of the tool, bleed screw, and waste line of FIG. 15B, shown with the tool and screw rotated a quarter-turn, thereby loosening the screw.

Once the tool 12 has been maneuvered onto bleed screw 14 as shown in FIG. 13, a process of bleeding the brake line may be carried out. FIG. 14 is a partially schematic diagram illustrating the use of the tool 12 and screw 14 with a brake system in accordance with one or more preferred embodiments of the present invention. If not previously attached, the waste line 16 is attached to the nozzle fitting 36 as shown in FIGS. 15A and 15B. Using the handle 54, counter-clockwise torque is applied to the socket wrench 56, thereby loosening the bleed screw 14 via its hex fitting 32. Conventionally, the screw 14 is rotated about a quarter-turn, as shown in FIG. 16, but determination of the exact amount will be within the skill of the mechanic. Brake fluid as well as air bubbles are then forced out of the brake line through any appropriate means, which may include the application of force to a brake pedal (as shown in the brake system of FIG. 14), application of direct pressure to the brake fluid from the other end of the brake line, suction, or the like. The brake fluid flows around the tip 22 of the bleed screw 14, through the cross bore 30, and into the internal passage 28. Because the proximal end of the bleed screw 14 is sealed against the check valve assembly 70 with the check valve open, the brake fluid can flow through the check valve assembly 70, into the central shaft 25, and finally through the nozzle fitting 36, where it can be expelled into the waste line 16 and ultimately collected in the waste receptacle 18.

Using generally conventional techniques, brake fluid is forced out until all air bubbles are removed therefrom. At that point, the screw 14 may be retightened and the tool 12 removed therefrom.

Advantageously, it is expected that due to the geometry of the tool 12, the internal passages of the tool 12 are sealed to the bleed screw 14 before the screw 14 is loosened, and thus there is no risk of brake fluid escaping in the period of time between loosening the screw and attaching the waste line 16. This, in turn, avoids accidental leaks or spillage, thereby preventing fires, damage to vehicle finishes, and slick unsafe floors, and facilitates easy disposal.

In various embodiments, the tool 12 and/or bleeder screw 14 may provide other advantages, including ease of service wherein brake bleeding can be much faster and more efficient, the brakes of vehicles with brake ducts may be bled without having to remove the ducts, brakes that are hot may be bled quickly without fear of fire or burns to the technician, the tool may be used with bias gauges, and/or the tool may be used to reverse-bleed the brake system.

In some embodiments, different bleeder screws are provided with different thread sizes, patterns, or the like in order to accommodate the different holes and valves that are inherent in different brake equipment. In at least some of these embodiments, some or all of the different bleeder screws are provided with similarly-sized hex fittings 32 such that the same tool 12 may be used with all of them.

Figure 17:
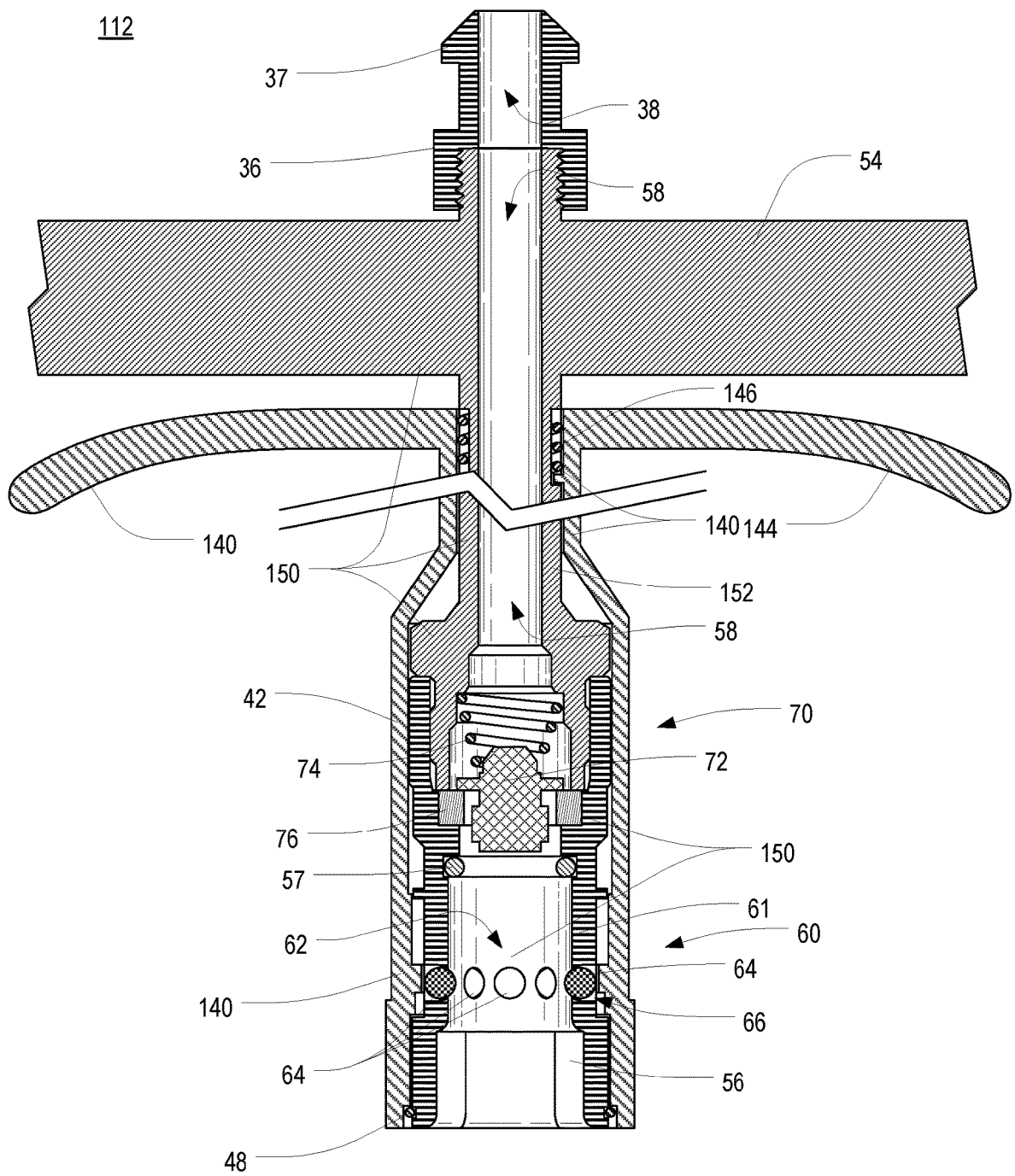
FIG. 17 is a fragmentary side cross-sectional view of an alternative quick-connect bleeder tool in accordance with one or more preferred embodiments of the present invention.

It will be appreciated that the tool 12 may be implemented in a variety of ways. For example, FIG. 17 is a fragmentary side cross-sectional view of an alternative quick-connect bleeder tool 112 in accordance with one or more preferred embodiments of the present invention. As shown therein, the tool 112 includes a primary assembly 150, a quick-connect actuator assembly 140, and a nozzle fitting 36. Like the primary assembly 50 of FIG. 7, the primary assembly 150 of the tool 112 of FIG. 17 includes a central shaft 152 having a perpendicular handle 54 near its proximal end and a set of operational components at or near its distal end, including a socket wrench 56, a female quick-connect fitting 60 immediately proximate from the socket wrench 56, and a check valve assembly 70 immediately proximate from the quick-connect fitting 60. The quick-connect actuator assembly 140 surrounds most of the central shaft 52 between the distal end of the shaft 52 and the perpendicular handle 54. The nozzle fitting 36 is disposed at the proximal end of the shaft 52, and the nozzle fitting 36 and the central shaft 52 each include a respective coaxial passage 38,58 extending longitudinally therethrough, wherein the coaxial passages 38,58 are in fluid communication with each other.

Figure 18:
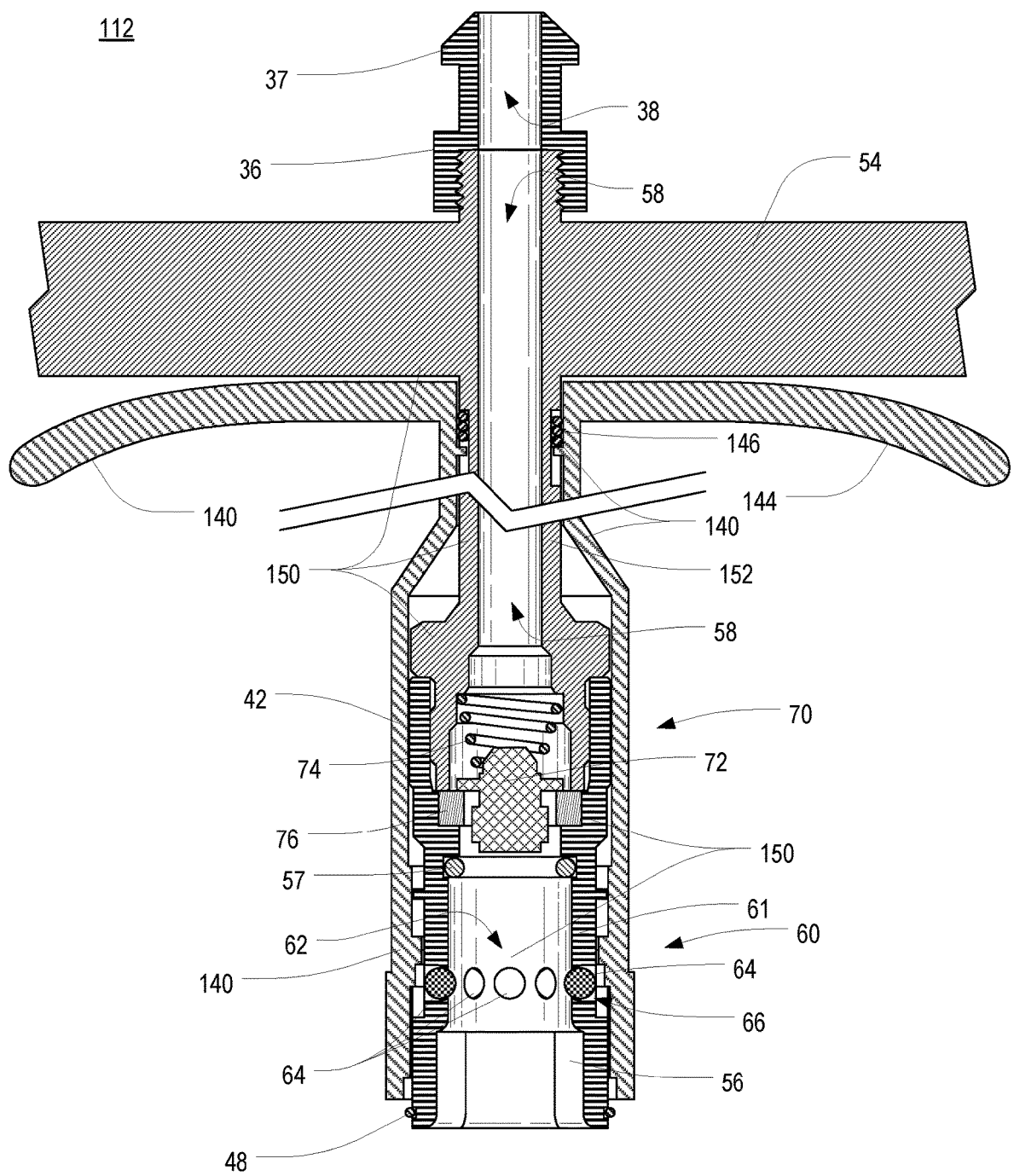
FIG. 18 is a fragmentary side cross-sectional view of the quick-connect bleeder tool of FIG. 17, shown with the T-grip actuator moved upward toward the handle.

Like the actuator assembly 40 of the FIG. 7, the quick-connect actuator assembly 140 of the tool 112 of FIG. 17 includes a sleeve 142, a T-grip actuator 144, a compression spring 146, and a removable stop 48. The sleeve 142 and T-grip actuator 144 are similar in many ways to the sleeve 42 and T-grip actuator 44 of FIG. 7, but are restructured to house and support the compression spring 146 in a different location. Instead of being located around the main body 61 of the female quick-connect fitting 60, the compression spring 146 is disposed at the upper end of the actuator assembly 140, around the upper end of the central shaft 152. Despite the change in location, however, the compression spring 146 of the tool 112 of FIG. 17 serves the same function as the compression spring 46 of the tool 12 of FIG. 7. More particularly, the spring 146 biases the sleeve 142 toward the distal end of the primary assembly 150. In this regard, FIG. 18 is a fragmentary side cross-sectional view of the quick-connect bleeder tool 112 of FIG. 17, shown with the T-grip actuator 144 moved upward toward the handle 54. As with the tool 12 of FIG. 7, movement of the sleeve 142 relative to the primary assembly 150 may be effectuated by gripping both the handle 54 and the T-grip actuator 144 and squeezing the T-grip actuator 144 toward the handle 54 with sufficient force to overcome the bias of the compression spring 146. When the T-grip actuator 144 is released, the compression spring 146 forces the sleeve 142 back toward the distal end of the primary assembly 150.

Figure 19:
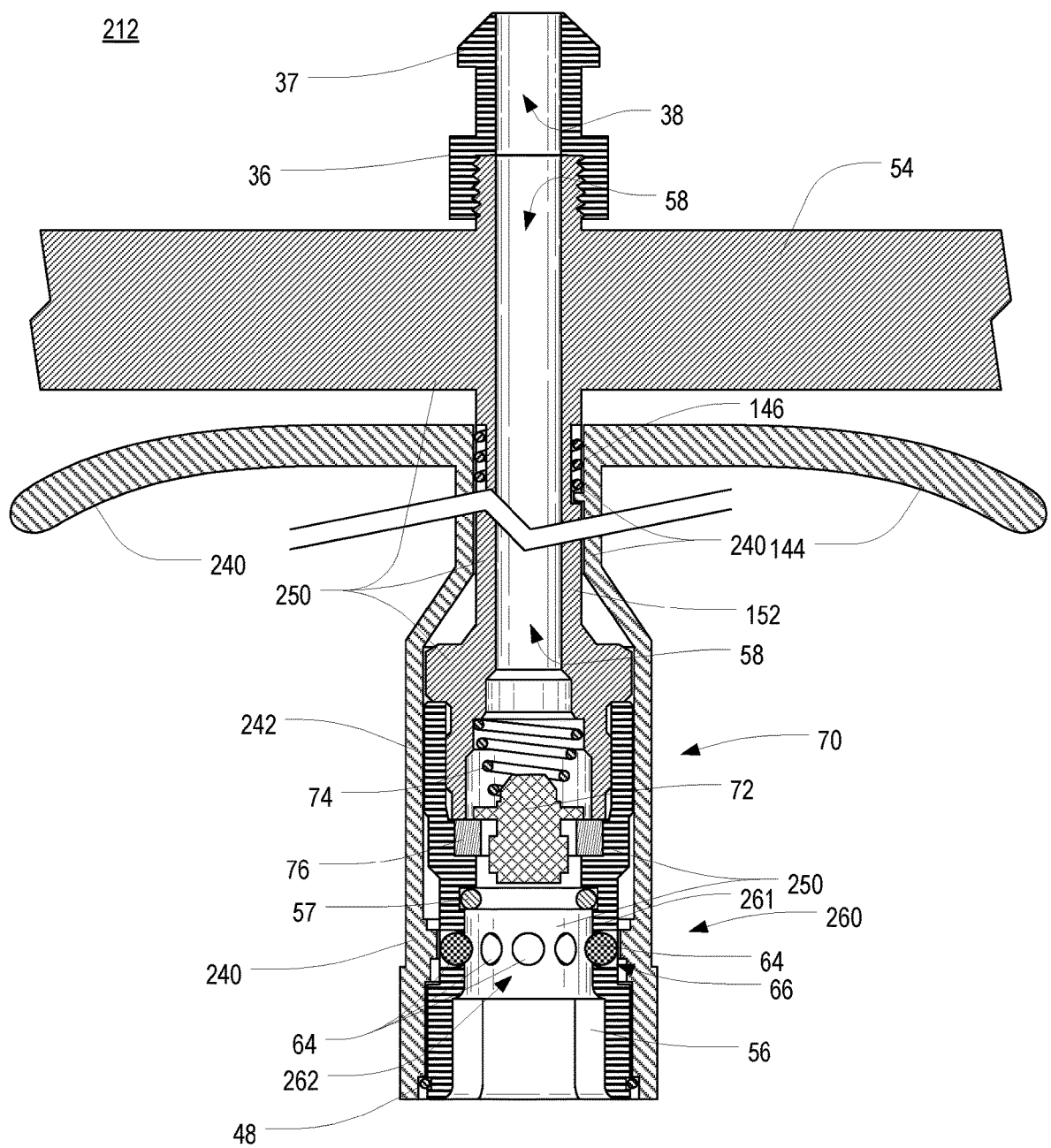
FIG. 19 is a fragmentary side cross-sectional view of another alternative quick-connect bleeder tool in accordance with one or more preferred embodiments of the present invention.
Figure 20:
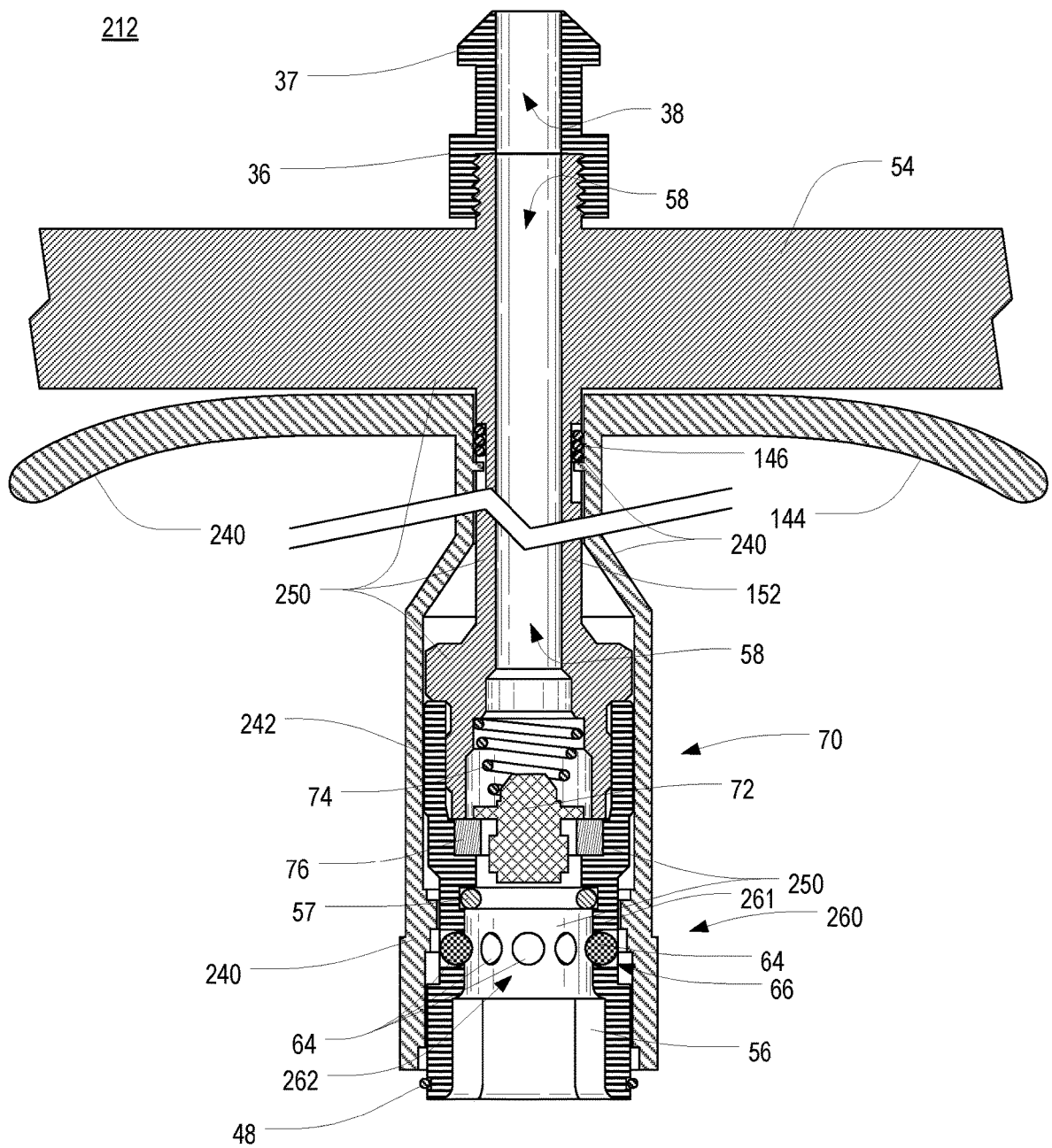
FIG. 20 is a fragmentary side cross-sectional view of the quick-connect bleeder tool of FIG. 19, shown with the T-grip actuator moved upward toward the handle.

In other implementations, the overall length (the vertical dimension in the various illustrations herein) may be reduced to make it easier for such a tool to be utilized in locations with less freedom of movement. For example, FIG. 19 is a fragmentary side cross-sectional view of another alternative quick-connect bleeder tool 212 in accordance with one or more preferred embodiments of the present invention. As shown therein, the tool 112 includes a primary assembly 250, a quick-connect actuator assembly 240, and a nozzle fitting 36. These elements are similar to those of the tool 112 of FIG. 17, except that the overall length has been reduced by shortening both the length of the primary assembly 250 and the length of the quick-connect actuator assembly 240. More particularly, the main body 261 and cylindrical receptacle 262 of the primary assembly has been shortened, and the sleeve 242 of the actuator assembly 240 has been shortened correspondingly. Operation of this tool 212 is similar to that of the tool 112 of FIG. 17. In this regard, FIG. 20 is a fragmentary side cross-sectional view of the quick-connect bleeder tool 212 of FIG. 19, shown with the T-grip actuator 144 moved upward toward the handle 54.

Figure 21:
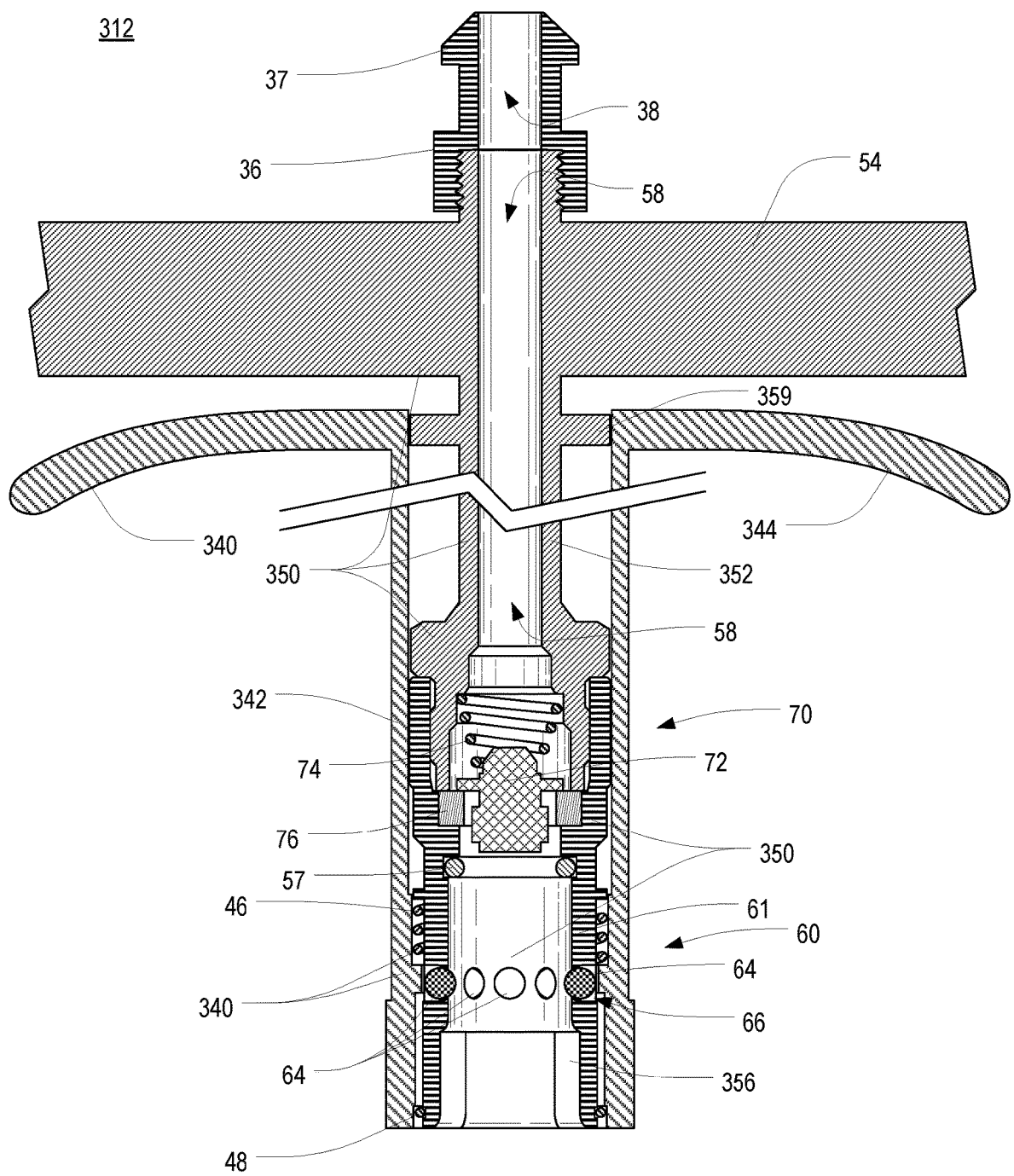
FIG. 21 is a fragmentary side cross-sectional view of another alternative quick-connect bleeder tool in accordance with one or more preferred embodiments of the present invention.
Figure 22:
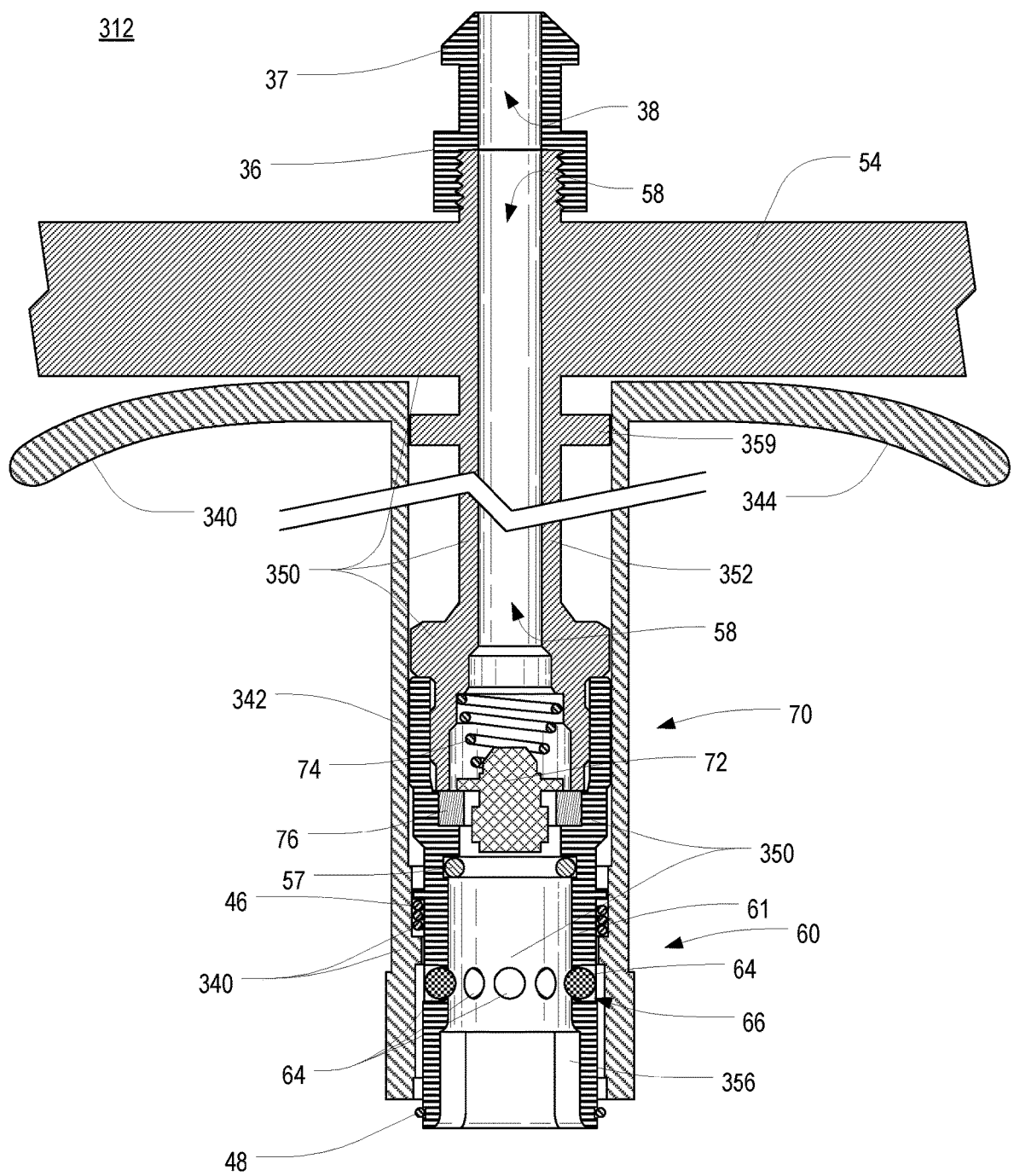
FIG. 22 is a fragmentary side cross-sectional view of the quick-connect bleeder tool of FIG. 21, shown with the T-grip actuator moved upward toward the handle.

Although a commercial version of a tool in accordance with one or more preferred embodiments of the present invention has not yet been developed, some implementations may facilitate easier and cheaper manufacturing. For example, in at least some embodiments, the entire primary assembly may be inserted into the interior of the sleeve, thereby reducing and/or simplifying manufacturing steps. In this regard, FIG. 21 is a fragmentary side cross-sectional view of another alternative quick-connect bleeder tool 312 in accordance with one or more preferred embodiments of the present invention. As shown therein, the tool 312 includes a primary assembly 350, a quick-connect actuator assembly 340, and a nozzle fitting 36. These elements are similar to those of the tool 12 of FIG. 7, except that the cross-section of the sleeve 342 has been restructured both at the proximal end and the distal end to make the interior thereof more uniform, and the cross-section of the a socket wrench 356 at the distal end of the primary assembly 350. To accommodate these changes, the T-grip actuator 344 has also been modified somewhat, and guides 359 have been added to the proximal end of the central shaft 352 to ensure alignment between the primary assembly 350 and quick-connect actuator assembly 340 is maintained. (Notably, the removable stop 48 may be installed after the quick-connect actuator assembly 340 has been installed in the primary assembly 350.) Operation of this tool 312 is similar to that of the tool 12 of FIG. 7. In this regard, FIG. 22 is a fragmentary side cross-sectional view of the quick-connect bleeder tool 312 of FIG. 21, shown with the T-grip actuator 344 moved upward toward the handle 54. Of course, a wide variety of implementations of this arrangement may be utilized without departing from the scope of the present invention.

Notably, different variations described herein may be combined together without departing from the scope of the present invention. For example, in some embodiments, a shortened tool is provided with a compression spring disposed at the upper end of the actuator assembly, and the quick-connect actuator assembly is designed to slide into the primary assembly during manufacturing.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. An interoperable tool and bleed screw, comprising:
    (a) a bleed screw, including:
        (i) a hollow shaft whose exterior includes a threaded portion,
        (ii) a tapered tip at a distal end of the hollow shaft,
        (iii) a cross bore near the distal end of the hollow shaft in fluid communication with an interior of the shaft,
        (iv) a male quick-connect fitting at a proximal end of the hollow shaft, and
        (v) a structural fitting around the exterior of the hollow shaft and adapted to be manipulated to alternatively tighten and loosen the bleed screw;
    (b) a tool for bleeding a hydraulic system, including:
        (i) a primary assembly having a hollow central shaft, a female quick-connect receptacle for receiving and releasably retaining the male quick-connect fitting of the bleed screw, and a socket wrench at a distal end of the primary assembly,
        (ii) a quick-connect actuator assembly in operative relationship with the female quick-connect receptacle, and
        (iii) a nozzle fitting, adapted to receive an end of a hydraulic fluid waste line, that is in fluid communication, via the hollow central shaft, with an interior of the socket wrench;
    (d) wherein the quick-connect actuator assembly may be manipulated, with the socket wrench positioned around the structural fitting on the bleed screw, such that the bleed screw is received and retained in the female quick-connect receptacle or is alternatively released from the female quick-connect receptacle; and
    (e) wherein the bleed screw may be turned, with the socket wrench, to loosen the bleed screw and thereby open a fluid passage into the bleed screw such that hydraulic fluid and air bubbles may flow from a hydraulic system into the bleed screw and on through the central shaft to the nozzle fitting.

2. A tool for bleeding a hydraulic system, comprising:
    (a) a primary assembly having a hollow central shaft, a female quick-connect receptacle for receiving and releasably retaining a male quick-connect fitting at a proximal end of a bleed screw, and a socket wrench at a distal end of the primary assembly;
    (b) a quick-connect actuator assembly in operative relationship with the female quick-connect receptacle; and
    (c) a nozzle fitting, adapted to receive an end of a hydraulic fluid waste line, that is in fluid communication, via the hollow central shaft, with an interior of the socket wrench;
    (d) wherein the quick-connect actuator assembly may be manipulated, with the socket wrench positioned around a corresponding structural fitting on a bleed screw, such that the bleed screw may be received and retained in the female quick-connect receptacle or alternatively may be released from the female quick-connect receptacle; and (e) wherein the bleed screw may be turned, with the socket wrench, to loosen the bleed screw and thereby open a fluid passage into the bleed screw such that hydraulic fluid and air bubbles may flow from a hydraulic system into the bleed screw and on through the central shaft to the nozzle fitting.

3. The tool of claim 2, wherein the quick-connect actuator assembly includes a sleeve around the female quick-connect receptacle, wherein the sleeve and the receptacle are part of a female quick-connect fitting that further includes a ring of movable balls set in openings in a wall of the female quick-connect receptacle and that are alternatively forced inward or allowed to move outward depending on a position of the sleeve around an outside of the female quick-connect receptacle.

4. The tool of claim 3, wherein the sleeve of the quick-connect actuator assembly is biased to a position that forces the movable balls inward to retain the bleed screw within the female quick-connect receptacle.

5. The tool of claim 4, further comprising a compression spring that biases the sleeve of the quick-connect actuator assembly to the position that forces the movable balls inward.

6. The tool of claim 5, wherein the compression spring is disposed at an upper end of the central shaft.

7. The tool of claim 2, further comprising a check valve interposed in the primary assembly between the female quick-connect receptacle and the nozzle fitting.

8. The tool of claim 7, wherein the check valve is opened when the bleed screw is fully received in the female quick-connect receptacle.

9. The tool of claim 2, wherein the nozzle fitting is disposed at a proximal end of the primary assembly.

10. The tool of claim 2, wherein the primary assembly includes a handle extending generally perpendicularly from the central shaft at a point adjacent the nozzle fitting.

11. The tool of claim 10, wherein the quick-connect actuator assembly includes a grip for manipulation thereof.

12. The tool of claim 2, wherein the socket wrench is a hex socket wrench that is adapted to fit around a corresponding hex fitting on the bleed screw.

13. The tool of claim 2, further comprising an O-ring arranged inside and at a proximal end of the female quick-connect receptacle to seal against an annular shoulder of the proximal end of the bleed screw when the bleed screw is retained in the female quick-connect receptacle.

14. A tool for bleeding a hydraulic system, comprising:
(a) a primary assembly having a hollow central shaft, elements of a female quick-connect fitting, and a socket wrench at a distal end of the central shaft;
(b) a quick-connect actuator assembly in operative relationship with the elements of the female quick-connect fitting; and
(c) a nozzle fitting, adapted to receive an end of a hydraulic fluid waste line, at a proximal end of the central shaft and in fluid communication with an interior of the socket wrench via the hollow central shaft;
(d) wherein the quick-connect actuator assembly may be manipulated, with the socket wrench positioned around a fitting on a bleed screw, such that the bleed screw may be received and retained by the female quick-connect fitting or alternatively may be released from the female quick-connect fitting; and
(e) wherein the bleed screw may be turned, with the socket wrench, to loosen the bleed screw and thereby open a fluid passage into the bleed screw such that hydraulic fluid and air bubbles may flow from a hydraulic system into the bleed screw and on through the central shaft to the nozzle fitting.

15. The tool of claim 14, further comprising a check valve interposed in the primary assembly between the female quick-connect fitting and the nozzle fitting.

16. The tool of claim 15, wherein the check valve is opened when the bleed screw is fully received in the female quick-connect fitting.

17. The tool of claim 14, wherein the nozzle fitting includes a mushroom-type head for connection to an open end of the hydraulic fluid waste line.

18. The tool of claim 14, wherein the primary assembly includes a handle extending generally perpendicularly from the central shaft at a point adjacent the nozzle fitting.

19. The tool of claim 18, wherein the quick-connect actuator assembly includes a grip for manipulation thereof.

20. The tool of claim 13, wherein the grip is a T-grip that may be squeezed toward the handle of the primary assembly to actuate the quick-connect actuator assembly.

\* \* \* \* \*